United States Patent [19]
Wolf et al.

[11] Patent Number: 5,901,313
[45] Date of Patent: *May 4, 1999

[54] APPLICATION MANAGEMENT SYSTEM

[75] Inventors: Julie M. Wolf, Crowley; Charles D. Lanier, Grapevine; Bryan L. Helm, Fort Worth, all of Tex.

[73] Assignee: AST Research, Inc., Irvine, Calif.

[*] Notice: This patent is subject to a terminal disclaimer.

[21] Appl. No.: 08/921,502

[22] Filed: Sep. 2, 1997

Related U.S. Application Data

[63] Continuation of application No. 08/459,026, Jun. 2, 1995, abandoned, which is a continuation of application No. 08/206,043, Mar. 4, 1994, Pat. No. 5,430,836, which is a continuation of application No. 07/664,175, Mar. 1, 1991, abandoned.

[51] Int. Cl.$^6$ ................................................. G06F 9/40
[52] U.S. Cl. .............................................. 395/682; 345/335
[58] Field of Search ................................. 395/680, 682, 395/683; 707/104; 345/335

[56] References Cited

U.S. PATENT DOCUMENTS

| | | | |
|---|---|---|---|
| 4,899,136 | 2/1990 | Beard et al. | 345/156 |
| 5,062,060 | 10/1991 | Kolnick | 345/339 |
| 5,079,695 | 1/1992 | Dysart et al. | 395/680 |
| 5,103,498 | 4/1992 | Lanier et al. | 395/68 |
| 5,287,514 | 2/1994 | Gram | 345/333 |
| 5,327,529 | 7/1994 | Fults et al. | 345/335 |

OTHER PUBLICATIONS

McMullen, Barbara E., McMullen, John F, What is a home computer anyhow?, Newsbytes, NEW08170041, Aug. 1990.
Chartock, David S., "3rd parties port to Tandy Interface", Computer & Software News, v6, n13, p. 1(2), Mar. 1988.
Perratore, Edward L, Fersko–Weiss, Henry, "Integrated software gets it all together", PC Magazine, v8, n22, p. 145(23), Dec. 1989.

Schulman, Andrew, "Glockenspiel Puts C++ to Work : CommonView is a C++ class library for Windows and PM," BYTE; vol. 15, No. 1., p. 213;, Jan. 1990.
Scheifler et al., "The X Window System", ACM Transactions, pp. 79–109, 1987.
Fersko–Weiss, "DeskMate," PC Mag., Dec. 12, 1989, p. 153.
Petzold, "DeskMate," PC Mag., Sep. 12, 1989, p. 115.
Guterman, "Tandy reported poised to add XT–Class and 286 machines," PC Week, Jul. 25, 1988, p. 2.
*DeskMate Getting Started*, Tandy, 1989, pp. 1–81.
*Microsoft Works User's Guide*, Microsoft Corp., 1989, pp. 1–45, 300–305.
*HyperCard Users Guide*, Apple Computer, Inc., 1988, pp. 1–161.
Dykstra, "Professional DeskMate 1.01 Integrated Package," PC World, Sep. 1988, pp. 194–196.
DeskMate Development System 03.03.00 About this Kit Chapter 1–5 and Appendices, 1989, Tandy Corporation.

*Primary Examiner*—Alvin E. Oberley
*Assistant Examiner*—St. John Courtenay, III
*Attorney, Agent, or Firm*—Knobbe, Martens, Olson & Bear, LLP

[57] ABSTRACT

An application management system for achieving a common user access (CUA) interface throughout multiple applications of a computer system is described. The system includes an operating environment having an application control module (ACM) that is run-time bound and executable by the applications. The ACM furnishes generalized procedural codes for each application. The application uses data structures to define the appearance and operation of the application to the ACM. The system also integrates the application program interfaces (API's) of an operating environment graphic user interface (GUI) system and a database management system (DBMS) within the ACM. The invention reduces the programming required for applications and improves consistency in programming across multiple applications.

29 Claims, 10 Drawing Sheets

Initialization Function

Action Interpreter

APPLICATION MANAGEMENT SYSTEM

This application is a continuation of U.S. patent application Ser. No. 08/459,026, filed Jun. 2, 1995, now abandoned which is a continuation of U.S. patent application Ser. No. 08/206,043, filed Mar. 4, 1994 (now U.S. Pat. No. 5,430,836, issued Jul. 4, 1995), which is a continuation of U.S. patent application Ser. No. 07/664,175, filed Mar. 1, 1995 (abandoned).

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF INVENTION

The invention relates to application programming systems for computers, and particularly to a system for achieving a common user access (CUA) interface with a computer operating environment throughout multiple applications utilizing dynamically linked, shared code.

BACKGROUND OF THE INVENTION

In order to program a computer effectively, a computer programmer must master a number of commands, application program interfaces (API's), and data structures. This usually requires a large investment of time learning specific techniques to code common basic functions for a specific operating environment. These common basic functions include presentation of data graphically on the screen, presentation of data on the printer, and storage and retrieval of data via a database management system. The requirement for generating and testing primitive code to build these common basic functions reduces the productivity of the programmer whose primary focus is to develop the specific functionality of the application.

Another important aspect of programming is consistency in the user interface where multiple applications are developed for use in a particular operating environment. A graphic user interface (GUI) is a means through which a computer system communicates with users. The GUI provides an assortment of controls or graphic user interface (GUI) components that are available for use by applications in the presentation and gathering of data. A GUI component is a graphic element that is used to display and accept information from the user. An application may define additional user interface components. Application defined components characteristically behave similar to GUI components.. Common user access (CUA) is the definition of GUI components that should be the same across all applications. The definition is based on a set of generally accepted user interface design principles. It is optimized for ease of use and encourages learning by exploring. CUA is helpful to the user because once the user learns the procedures to implement commands for achieving particular results in one application, he can expect the same procedures to apply in other applications.

In a programming environment, the framework, interaction techniques and other characteristics for defining a CUA interface are determined by procedural code written by the application programmer to implement various responses to user actions. Differences in coding techniques and style from one programmer to the next make it difficult to insure consistency in a CUA. In addition, even if CUA is accomplished, the procedural codes developed by one programmer will differ from another thereby requiring individual testing of the same characteristic of the CUA in multiple programs.

Consistency in coding of CUA procedural code and common basic functions is therefore desirable to ensure thorough testing and quality control where multiple program authors with individualized coding styles each contribute to a package of applications. In order to achieve this consistency, procedural codes to maintain a CUA may be coded one time, then shared between multiple applications. Similarly, many common basic functions of each application may be coded once and shared. This increases the productivity of the programmer and also avoids duplication of effort in programming. In the past, sharing of common basic functions has been done by the use of code libraries. Code libraries have the advantage that a piece of code can be developed, tested and maintained "outside" of the application program. The program then links to this library and at link time the code is placed into the application's executable file. The disadvantage of this method is that all the programs that require this code will have it contained in their executable file. This increases the size of each application file and may present a problem where multiple applications are desired for use on computers with limited disk and/or memory space.

Runtime loadable control modules have been developed to provide shared code that can be used by a variety of applications. The shared code contains routines to aid the programmer in code development. These modules generally deal with one specific area of programming. One such runtime loadable control module is a database management system module that handles the reading and writing of data in a record oriented input/output method. Another runtime loadable control module is an operating environment module that provides the GUI of the particular operating environment for interaction with the user via the computer keyboard, pointing device, screen or printer. For example, in the Tandy DeskMate operating environment, the database management system module is referred to as the DeskMate Database Management System (DMDB) and the operating environment GUI module is referred to as the DeskMate Core Services Resource (CSR).

The advantage of using runtime loadable control modules is that they allow for the storage of code in one location that may be accessed and shared among multiple applications without the necessity for duplicating the code in each application program. However, runtime loadable control modules traditionally do not incorporate procedural code that wholly contains a CUA. Such code governing reactions between components on a screen in response to user action or input tends to be application specific.

In addition, runtime loadable control modules associated with the respective GUI and database management systems have historically been disjoint. Each of the GUI and database management systems of an operating environment are defined through separate and distinct API and data structures. In order to utilize both the GUI and database management systems, an application must contain code that separately manages each of the GUI and database management system's unrelated data structures. The application must also contain code to translate data from one set of data structures to the other set of data structures. The application must further contain code that defines the relationship between data that is stored on the disk and data presented to the user via the GUI common basic functions.

SUMMARY OF THE INVENTION

The invention recognizes the need for maintaining common user access (CUA) through the use of shared procedural code where multiple applications written by various programmers are implemented in a particular operating environment. The invention also recognizes a need for integrating the GUI and database management systems of an operating environment, each having their own unique API's and data structures. The result is greater efficiency and productivity in application programming.

According to the invention, an application management system provides an operating environment for multiple applications using a common user access interface in a computer system. Data is defined in each application for describing the appearance and operation of the application. A module is linked to the applications. The module is used by the applications to initialize the data in the applications, present a display screen defined by the data, process user input events in accordance with the operation defined by the data and close the application. The module may be run time loadable.

The invention eliminates the need to write procedural code in each application to maintain CUA. The invention also eliminates the need to write code to perform the functions of database management (add, delete, update, read a record), the GUI functions (display data, print data, respond to user input) and the data translation algorithms between the GUI and database management systems. The invention increases the programmer's productivity by optimizing the programmer's use of development time and reducing test and debug time.

DETAILED DESCRIPTION OF THE PREFERRED EMBODIMENT

Figure 1:
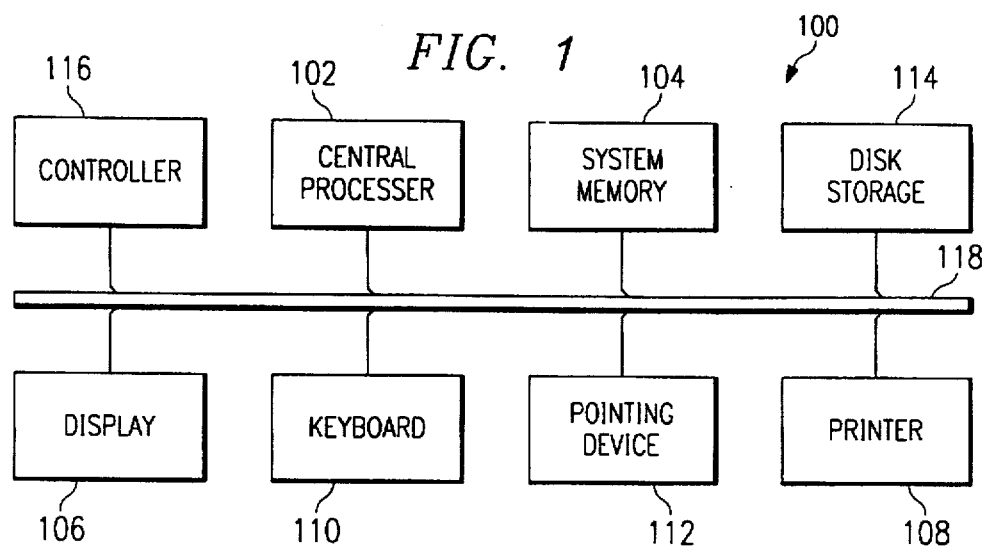
FIG. 1 is a block diagram of a computer system in which the invention may be embodied.

Referring to FIG. 1 of the drawings, the preferred embodiment of the invention is implemented on a computer system 100 having a central processor 102, a system memory 104, a display 106, a printer 108, a keyboard 110, a pointing device 112, a disk storage 114, an I/O controller 116, and interconnecting means 118, such as a system bus. In the preferred embodiment a Tandy 1000 series computer manufactured by Tandy Corporation of Ft. Worth, Tex. is used as the system 100.

Figure 2:
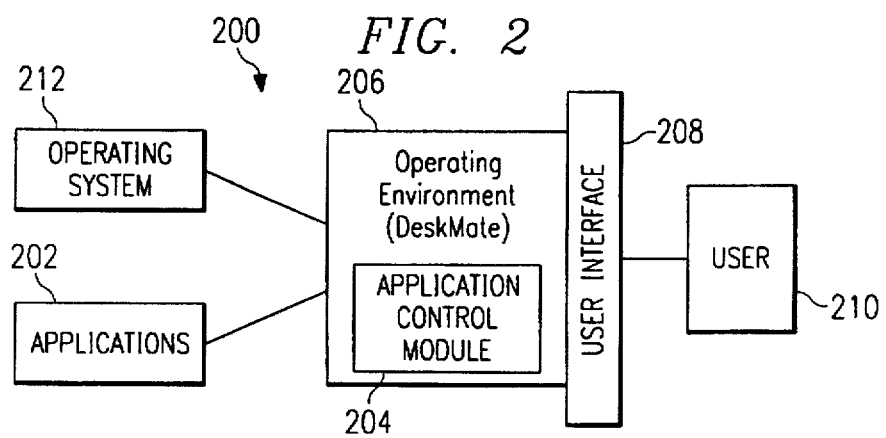
FIG. 2 is a block diagram of a computer software system used in the preferred embodiment.

Referring to FIG. 2, a computer software system 200 is shown for programming one or more computer applications 202 to be implemented by the computer system 100 of FIG. 1. Software system 200 is stored in the system memory 104, and on the disk storage 114. System 200 programs the central processor 102 to display a graphic user interface (GUI) on the display 106. An application control module 204, as will be discussed subsequently in detail, is implemented in an operating environment 206. The operating environment 206 provides a software user interface 208 between a user 210, the computer application 202, and an operating system 212. In the preferred embodiment, the operating environment 206 is the Tandy DeskMate environment. Detail regarding the DeskMate environment is contained in the DeskMate Development System Manual, incorporated herein by reference and available from Tandy Corporation of Ft. Worth, Tex. It is understood that all function calls referenced throughout this specification are part of DeskMate. It will be apparent, however, that one of ordinary skill in the art, informed by this specification, could implement the invention in other operating environments.

As will be described further below, the application control module 204 enables programmers to develop applications 202 that conform to a specific CUA by defining data structures rather than by writing procedural code. The application programmers use shared code provided by the module 204 defining the CUA interface and can concentrate on developing the logic of the particular application.

Figure 3:
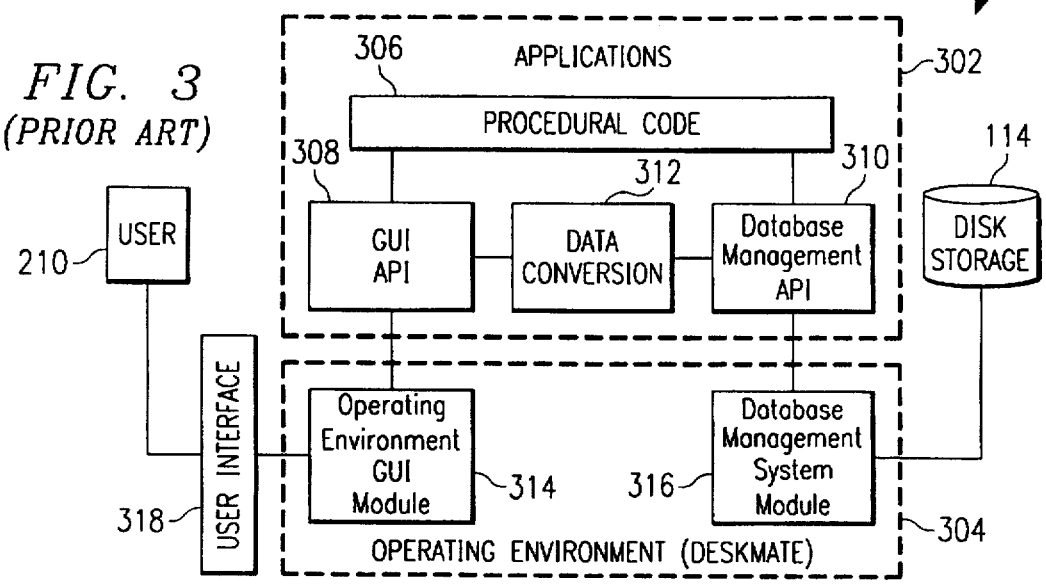
FIG. 3 is a block diagram of a prior art computer software system showing the elements of an application and how the application interacts with the operating environment.

In order to understand the invention, FIG. 3 depicts a prior art software system 300 to show the development process normally required for writing an application 302 in an operating environment 304.

The application 302 comprises procedural code 306, a GUI API 308, a database management API 310, and data conversion code 312. While not shown, it is understood that the application 302 also includes code for performing the functions specific to that application. The operating environment 304 (DeskMate, for example) includes operating environment GUI modules 314 and a database management system (DBMS) module 316. The GUI modules 314 are run time loadable control modules and are accessed via the GUI API 308 contained in the application 302. The GUI modules 314 are for programming a software user interface 318 which interacts with a user 210. The DBMS module 316 is accessed via the database management system API 310 in the application 302 and performs all record oriented file input/output (I/O) with a disk storage 114.

The GUI API 308 provides functions to control the video display 106, printer 108, pointing device 112, communications ports (not shown) and other devices. It also provides a method for the application 302 to receive user input through additional function calls. The application 302 is responsible for evaluating each user input or action and determining the appropriate reaction.

The database management API 310 provides record level access into files. The application 302 provides the definition of records in a file, and the database management API 310 provides functions such as retrieving, adding, updating, deleting, sorting, and searching of records.

Figure 4:
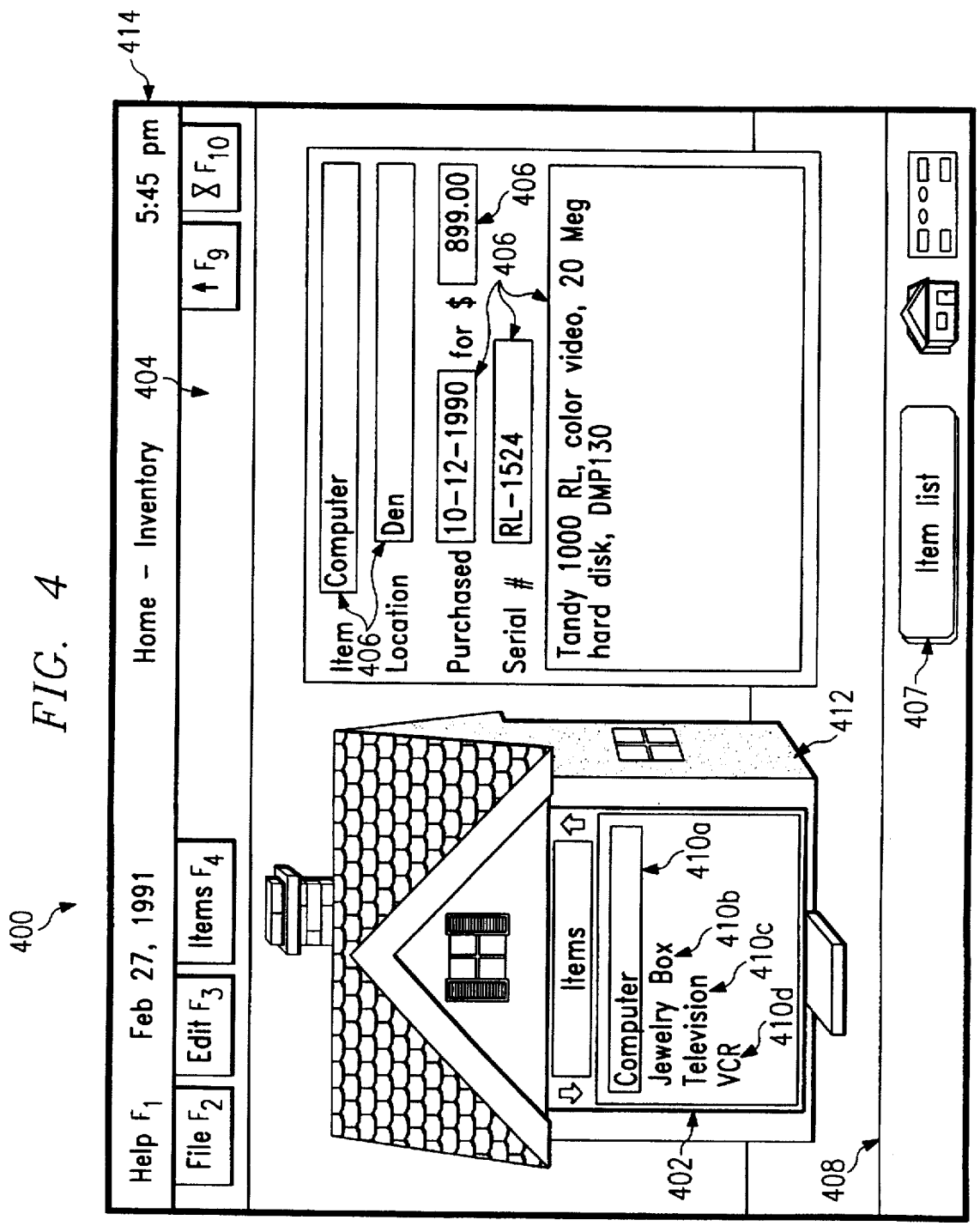
FIG. 4 illustrates a computer screen display showing common user access interface components.

Referring also to FIG. 4, the application 302 designs the presentation of data to the user on an example screen 400 through the use of GUI components placed in particular locations on the screen. The GUI components include a listbox 402, a menubar 404, one or more editfields 406, push buttons 407, and one or more application defined components. The application defined components include, for example, a navigation bar 408. The navigation bar provides an easy method for the user to move between related applications. The list box 402 contains items 410a–410d from which the user can select one item. The editfields 406 include data which appears depending on which of the items 410a–410d in the list box have been selected. The selected item 410a is designated by highlighting the item in listbox 402. Graphic pictures 412 may also be displayed. A title line 414 is displayed at the top of the screen 400. While not shown, it is understood that other GUI components may be displayed such as scroll bars, radio buttons, check boxes or the like.

For example, the application 302 will build a list of items 410a–410d consisting of a single field from each of several records by calling the database management system 316. The application 302 will then place that list of fields into the listbox 402 and set selection to the first item 410a. The application will then read the record associated with the field selected 410a in the listbox and place that data in the editfields 406. The application 302 will then call the appropriate GUI functions 314 to display the listbox 402 and editfields 406 containing the new information.

The user will perform work by taking some action via the keyboard 110 or the pointing device 112. This action is interpreted by the application procedural code 306. The application procedural code 306 determines what the appropriate reaction is to that action. For example, the user may select a new item 410b, "Jewelry Box" in the listbox 402 by using the pointing device 112 or the arrow keys (not shown) of the keyboard 110. The application procedural code 306 reacts to this action by determining that the selected item in the listbox 402 has changed. The procedural code 306 determines the new data to be retrieved by identifying the selection stored in GUI component data structures for the listbox 402. The GUI component data structures are described in detail in Appendix B. The procedural code 306 calls a function in the DBMS module 316 to retrieve the data associated with the new selection. After retrieving the data, the application data conversion code 312 converts the data from a DBMS data structure into the appropriate GUI component data structures (editfields 406, for example). The DBMS data structure is described in detail in Appendix A. The application 302 then makes the appropriate GUI function calls to display the new data.

The above method of handling GUI components and retrieving data from the DBMS module 316 in response to user input is a standard method by which applications interact with a user. Due to the different number of components and different types of data that may be required for each unique application 302, the code to implement this standard method is customized for each application. The different code in each application 302 makes it difficult to achieve a CUA interface across multiple applications and share similar code across multiple applications.

Figure 5:
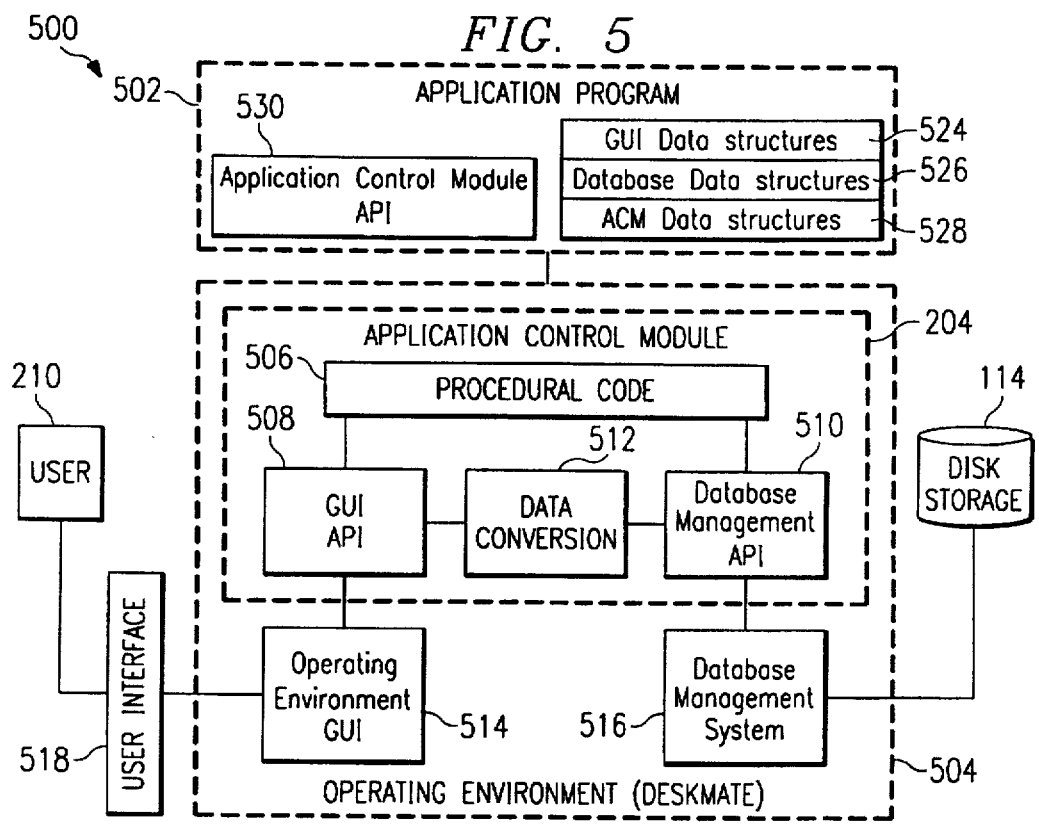
FIG. 5 is a block diagram showing in greater detail a computer software system used in the preferred embodiment.

FIG. 5 shows in greater detail a software system 500 of the present invention for programming one or more applications 502 to run in an operating environment 504. Procedural code 506, a GUI API 508, a database management API 510 and data conversion code 512 are all included within the application control module 204. The operating environment 504 also includes operating environment GUI modules 514 and a DBMS module 516. The GUI modules 514 are runtime loadable control modules and are accessed via the GUI API 508. The GUI modules 514 are for programming a software user interface 518 which interacts with a user 210. The DBMS module 516 is accessed via the DBMS API 510 and performs all record oriented file I/O with a disk storage 114.

All of the above described elements are contained outside of the application 502 and otherwise function substantially the same as the corresponding elements described with reference to FIG. 3, with the exception of the procedural code 506 and the data conversion code 512. The procedural code 506 and the data conversion code 512 are generalized for access by multiple applications and do not need to be developed in each application. These modules are included in a separate application control module (ACM) 204 loadable by the application. This eliminates the need for the procedural code and data conversion code to be physically linked into each application.

The application 502 includes GUI component data structures 524, database data structures 526 and ACM data structures 528. The GUI component data structures 524 and the database data structures 526 are the same as those previously described and set forth in Appendices A and B. The ACM data structures are set forth in Appendix C.

An ACM API 530 is included in the application 502 and is used to pass data defined in the ACM data structures 528 to and from the application 502 and the ACM 204. The ACM data structures 528 describe to the ACM 204 the appearance and operation of the application 502. While not shown, it is understood that the application 502 also includes coding for performing the functions specific to that application excluding the procedural code for the execution of the application CUA.

Referring to FIGS. 4 and 5, a brief example will be described to explain the operation of the system 500. The application 502 passes data to the ACM 204 to describe that there is a listbox 402 and editfields 406 on the screen 400 for presenting data from the DBMS module 516. The ACM 204 will build a list containing the specified field from all database data (records) that match the specified query. The ACM 204 will convert the built list so it may be used by the listbox 402. A specified item in the listbox 402 will be highlighted to indicate selection. The data (record) corresponding to that selection will be read from the database management system 516. All fields read by the ACM 204 will be placed in the prescribed editfields 406 by means of the ACM data conversion code 512. The ACM 204 has initialized and now displays the listbox 402 and editfield 406 GUI component data structures. It is understood that the ACM will also display any requested graphic pictures 412, static strings, or icons.

The ACM 204 will wait for user input. When the ACM receives a return code from the GUI component (such as listbox 402 or editfield 406) the ACM will match that return code to a corresponding command defined by the application. The ACM 204 will execute that associated command. Accordingly, when a user selects a new item in a listbox, the ACM 204 will retrieve the corresponding data and display it in the appropriate editfields 406 without application intervention.

ACM Architecture

Figure 6:
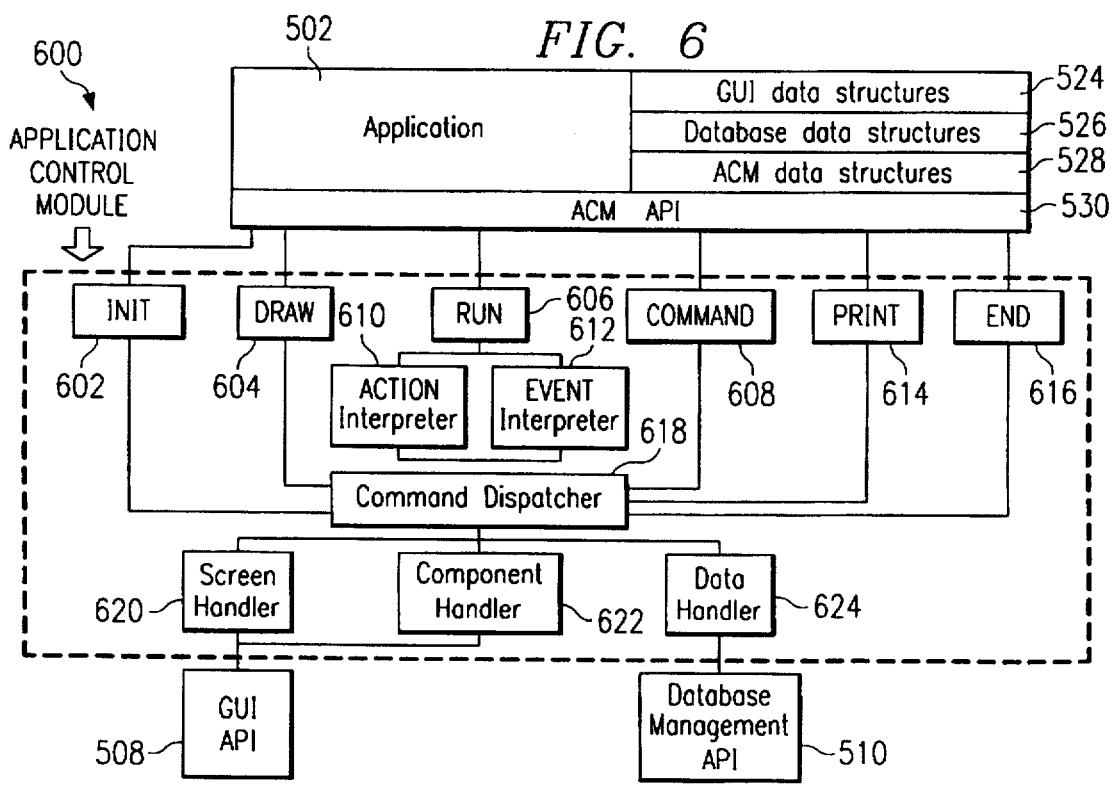
FIG. 6 is a block diagram showing the computer architecture of the application control module (ACM) of the computer software system used in the preferred embodiment.

FIG. 6 depicts the overall architecture 600 of the application control module (ACM) 204. The ACM 204 provides multiple functions to the application 502 via the ACM API 530. A brief definition of the functions is as follows. INIT 602 (tm_init) allows the application 502 to register with the ACM 204 and initialize its screen and data. DRAW 604 (tm_draw) allows the application to request that the ACM 204 draw all or any portion of its screen. RUN 606 (tm_run) waits for user input and invokes an action interpreter 610 and an event interpreter 612, discussed further below, for processing all user input until some action occurs that it doesn't know how to process, then it returns control to the application 502. COMMAND 608 (tm_cmd) allows the application 502 to request that the ACM 204 perform a specific command. PRINT 614 (tm_print) instructs the ACM 204 to print data. END 616 (tm_end) causes the application 502 to notify the ACM 204 that it is terminating and any necessary cleanup by the ACM can occur.

The ACM 204 is based on a series of commands. A command is an instruction to a command dispatcher 618 to transform user action into procedural code to do the requested work. All of the ACM functions interact with the command dispatcher 618. The command dispatcher 618 invokes commands through a series of function calls to one or more handlers. The handlers include a screen handler 620, a component handler 622 and a data handler 624. The screen handler 618 and the component handler 620 interface with the GUI API 508 to achieve a CUA interface. The data handler 624 interfaces with the DBMS API 510 to retrieve and store data in the disk storage 114.

The action and event interpreters 610 and 612 make decisions as to what combination of commands are to be invoked based upon user action. The action interpreter 610 will process each component return code to determine if there is an associated command to be executed. This is detailed further in FIG. 10. The event interpreter 612, described further in FIGS. 11A and 11B, processes user input. The user input is translated into commands which are are executed through calls to the command dispatcher 618. Status information is reported to the application 502 as requested.

Figure 7:
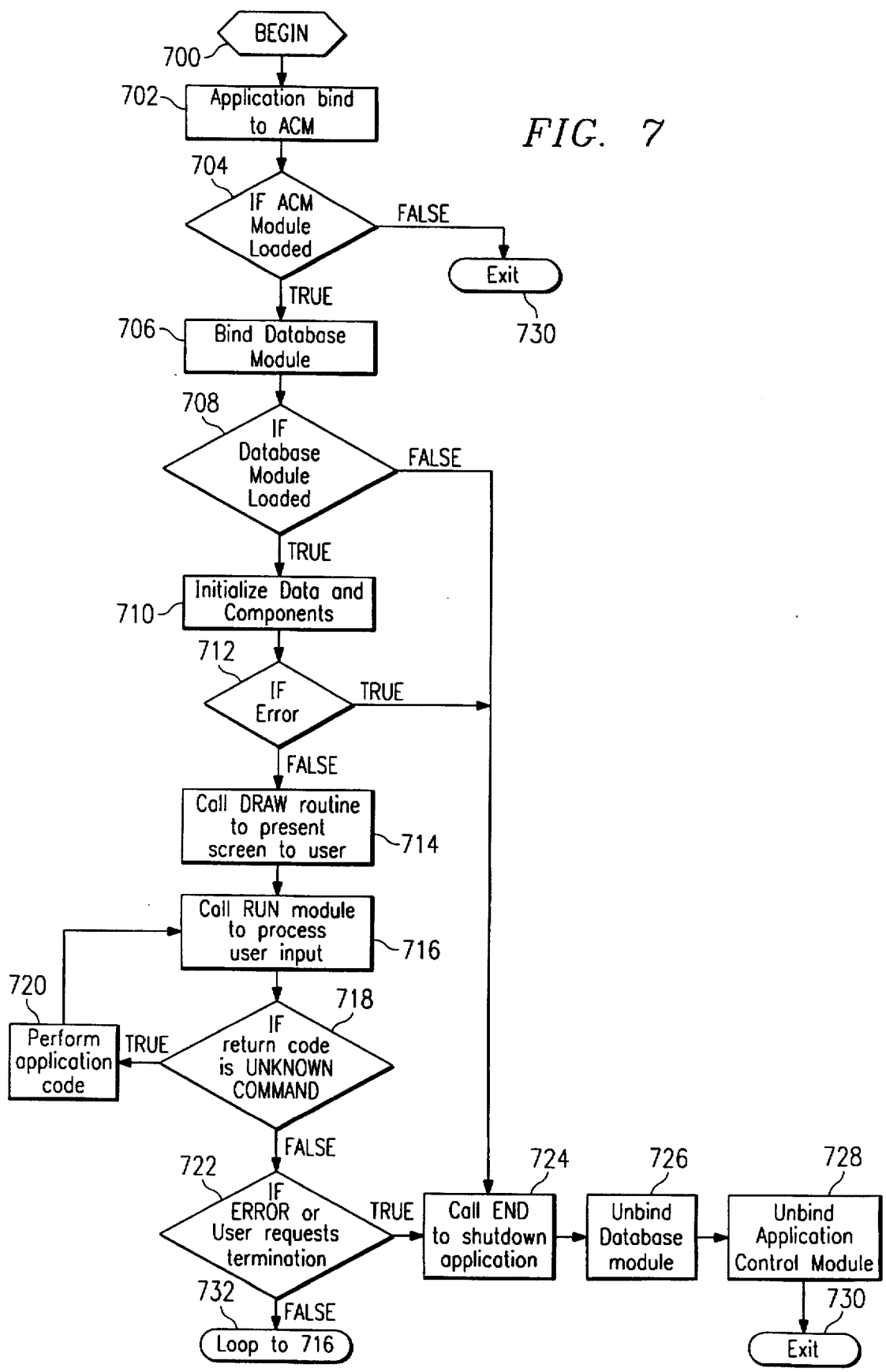
FIG. 7 is a flow chart of the general methods of the computer software system used in the preferred embodiment.

FIG. 7 illustrates how an application 502 would utilize the ACM 204 to perform most of the application's general processing.

The application 502 begins execution at step 700. At step 702, the application requests that the ACM 204 be loaded into system memory 104. Once loaded, the ACM 204 is dynamically linked or bound to the application. At the time that the ACM 204 is loaded into system memory, the operating environment GUI module 514 is bound to the ACM 204. Reference is made to the DeskMate Development, System manual for a further explanation of loading and binding to a module at runtime. Step 704 checks for an error. If an error has occurred, the application 502 terminates through step 730 discussed further below. If there is no error, control proceeds to step 706. The application 502 directs the ACM 204 to load into the system memory 104 and bind to the appropriate database management system module 516. Step 708 performs an error check. If an error has occurred in loading the database management system 516, control proceeds to step 724, described below. If no error has occurred, control is able to proceed to step 710 and all the required runtime loadable control modules (GUI 514 and DBMS 516) are in memory and operating. Step 710 calls the INIT 602 function. The INIT 602 function, discussed in further detail below, initializes the data and user interface components in preparation for display to the user. Step 712 checks for an error in the initialization. If an error has occurred, the application 502 exits at step 730. If there is no error, step 714 calls the DRAW 604 function to draw the entire screen. A loop is then entered at step 716. Step 716 calls the RUN 606 function of the ACM 204. This function will process all user input and react accordingly until an error occurs, or user input generates a command that the ACM 204 doesn't know how to process. At step 718 a check is made to see if the return code from the ACM 204 indicates if there is an unknown command, which indicates there is processing to be done by the application. If so, the application 502 processes its specific functions at step 720, then loops to step 716. If there is no unknown command, control proceeds to step 722. At step 722, if the return code from the ACM indicates that the user wishes to terminate the application or an error has occurred, the application proceeds to step 724. If there is no error, control goes to step 732 which loops back to step 716. At step 724, the application 502 calls the END 616 function, discussed in further detail below, to request the ACM 204 to close the application. At step 726, the application 502 requests that the ACM 204 unbind from the database modules. At step 728, the application 502 unbinds from the ACM 204. At step 730, the application is exited.

Initialization Function

Figure 8:
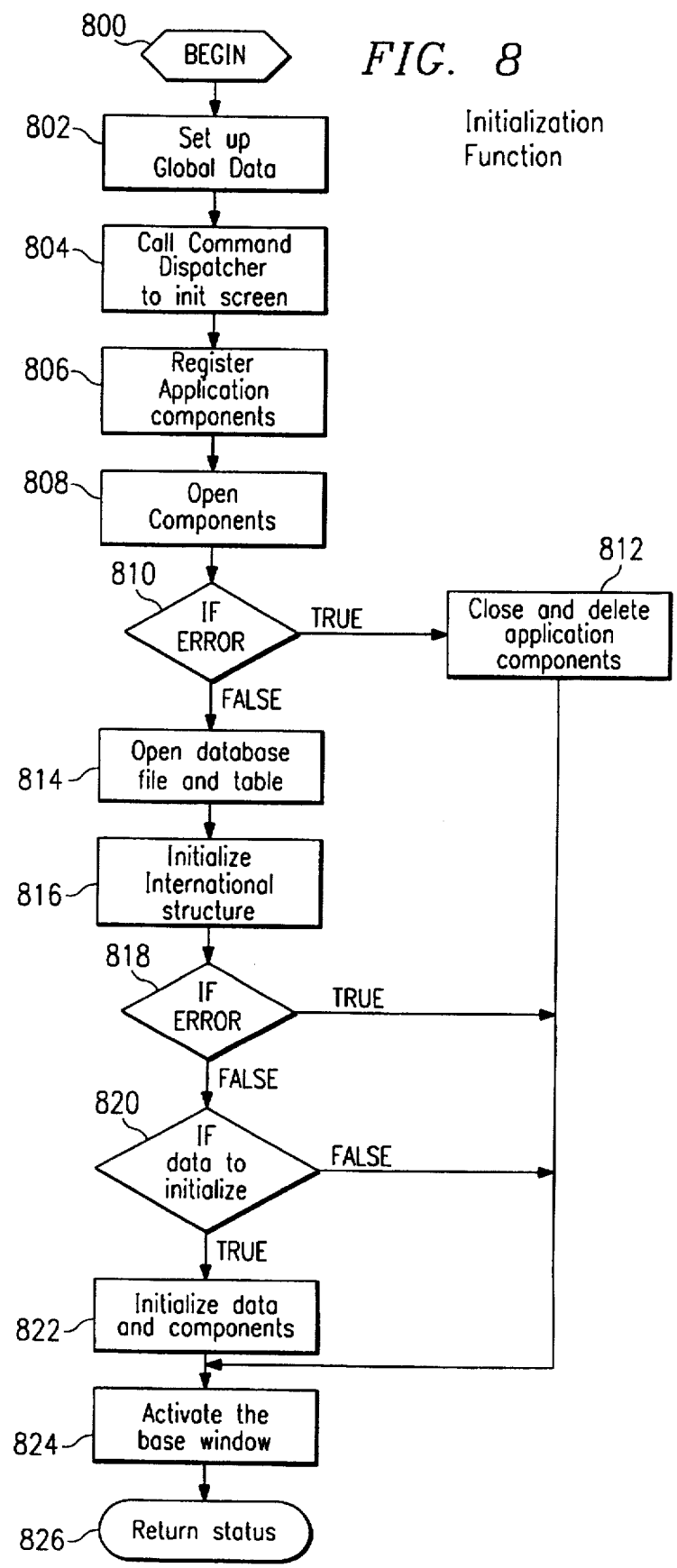
FIG. 8 is a flow chart of the methods of the INIT function.

FIG. 8 illustrates the flow of the INIT 602 function. INIT 602 is an initialization function for the ACM 204. The initialization routine is responsible for setting up the screen, opening the database and initializing any data.

Control of the INIT 602 function begins at step 800. At step 802 global data pointers are initialized to the TEMPLATE_RUNTIME, TEMPLATE_SCREEN and TEMPLATE_DATA structures of the ACM data structures 528 in the application 502. These data structures are described in Appendix C. Step 804 calls the command dispatcher 618 to initialize the screen. The screen is initialized by creating an application work window for the application 502, setting up the color palettes, and drawing the title line 414 and menubar 404. The TEMPLATE_SCREEN structure (Appendix C) defines all the necessary elements. Step 806 adds any application defined components that are defined in the TEMPLATE_SCREEN structure to the operating environment 504. Step 808 opens all the GUI and application defined components so that they are properly registered with the operating environment 504. The application 502 defines its components in the pCmps array in the TEMPLATE_SCREEN structure. Step 810 checks to see if an error has occurred. If there is an error, control proceeds to step 812 to close the components that have been opened and delete the application defined components that have been added. Control then proceeds to step 824, described below. If there is no error at step 810, control proceeds to step 814. At step 814 the database file as indicated by the pFile element of the TEMPLATE_DATA structure (Appendix C) is opened. This is done by calling functions in the data handler 624. The data handler 624 creates the appropriate DBMS structures and calls the database management module 516. Step 816 will initialize the international structure pIntl that is in the TEMPLATE_RUNTIME structure. The international structure is used by the application 502 to determine the defined country's currency symbol, date and time formats. Step 818 checks to see if an error has occurred. If there is an error, control goes to step 824. If there is not an error, control proceeds to step 820 and checks to see if there is data to be read from the database to initialize the components. If there is data to be read, the command dispatcher 618 is called at step 822 with an appropriate initialization command to read one or more records from the DBMS 516. Control then goes to step 824 where the base window is reactivated. Control returns to the application 502 with the current status in step 826.

Draw Function

The DRAW 604 function consists of a set of routines that define the screen handler 620. These routines are accessible by the ACM 204 so that the screen can be updated as needed, and are also accessible by the application 502. This module accepts an identifier (ID) as input that indicates which portions of the screen are to be drawn. These ID's can be one of the following with the associated action performed:

DRAW_SCREEN—draws the entire screen including the menubar and title line.

DRAW_WORK—draws the area below the menubar.

DRAW_CMPS—draws all components

DRAW_STATS—draws all static elements. These include static strings, pictures, and icons.

REDRAW_CMPS—draws all components that have their redraw flag set, then resets the redraw flag.

DRAW_MB—draws the menubar without setting the redraw flag. This must be called whenever a menuitem changes its state so that the new state will be reflected if the user selects that menubar. This includes graying, enabling, checking, and unchecking of menubar items.

DRAW_ALL_MB—sets the menubar redraw flag, then draws the menubar.

DRAW_TITLE—draws the title line

ERASE_MB—removes the current menubar.

Run Function

Figure 9:
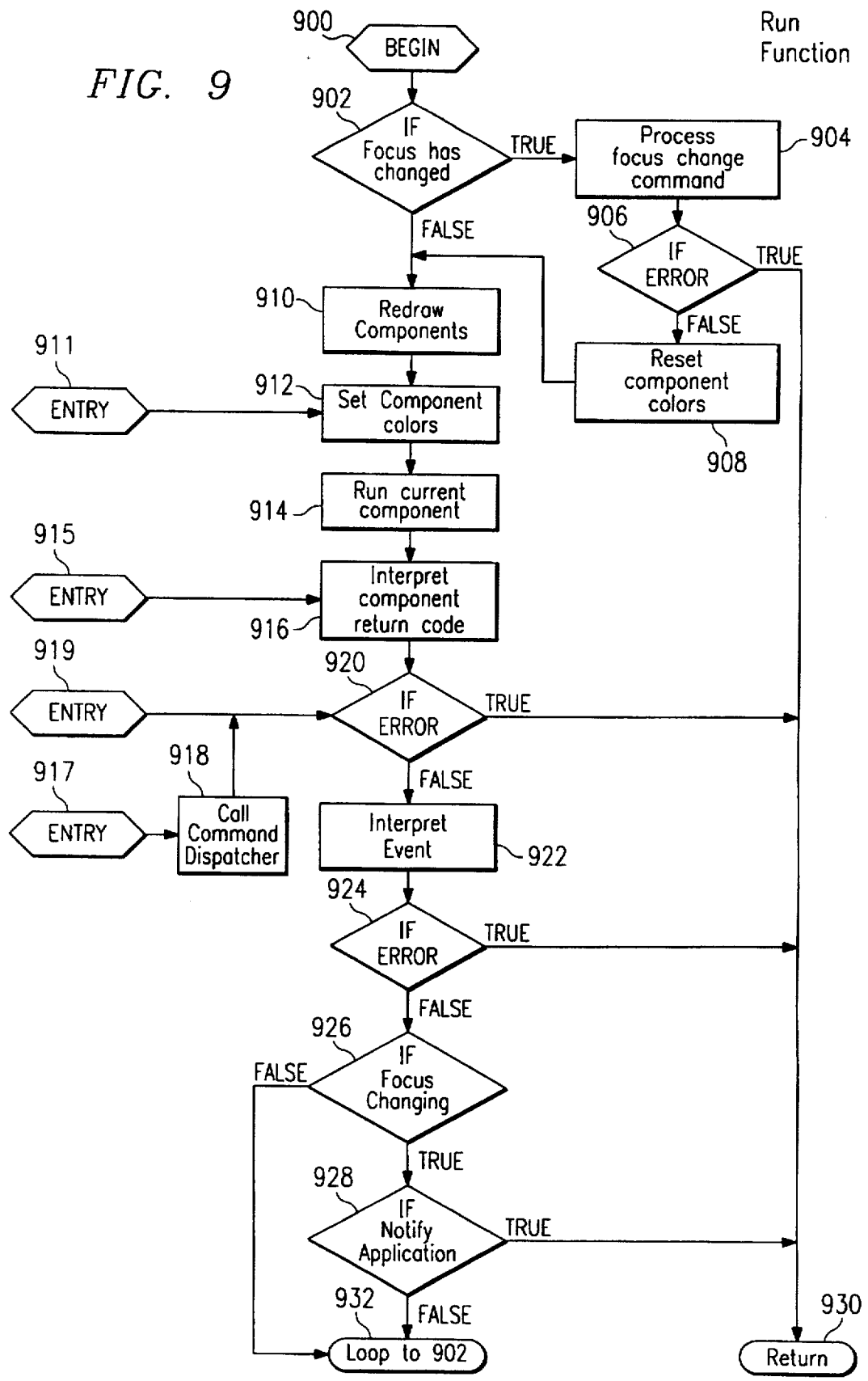
FIG. 9 is a flow chart of the methods of the RUN function.

FIG. 9 is a flow chart illustrating the general method of the RUN 606 function (tm_run). This is the main control loop in the ACM 204 that runs components, processes component return codes, performs database commands, processes the menubar and interprets user events.

Control of the RUN 606 function begins at step 900. At step 902, a check is made to determine if the component with focus has changed. Focus refers to which component on the screen will receive the user's input. For example, in FIG. 4, focus is directed to the highlighted item 410 in the listbox 402. Focus may be indicated by particular colors for an editfield, by a dashed box surrounding a pushbutton, by an inverted title on a listbox, or some other graphic means. Focus change is detected by comparing prev_focus and focus_id elements of the TEMPLATE_RUNTIME structure of the ACM data structures 528. (Appendix C). If focus has changed at step 902, then the command dispatcher 618 is called at step 904 to process the focus change. Focus change processing saves any modified data that needs to be saved, and initializes the new component receiving focus. Initialization of the new component includes such interface characteristics as selecting text in an editfield, setting the cursor position correctly or initializing an UNDO menu item. At step 906, a check is made to see if any error occurred at step 904. If an error has occurred, control goes to step 930 to return to the application 502. If no error occurs in step 904, control proceeds to step 908. At step 908 the colors of the component that lost focus are reset to their defaults. The previous component's redraw flag is set. The redraw flags are part of the TEMPLATE_SCREEN structure (Appendix C).

Control then resumes at step 910. The command dispatcher 618 is instructed to redraw the components defined by the application 502. The command dispatcher 618 is subsequently described in detail later. Only those components whose redraw flag is set will be redrawn. All the redraw flags are then reset. At step 912, the colors are set for the component with focus. The setting of colors for a component with focus implements the CUA standard that the component with focus will be displayed on the screen with a different color set than all the other components. Step 911 allows the application 502 to specify that program execution of the RUN 606 module begins at step 912. The component with focus is run in step 914. When a component is run, a call is made to a function in the operating environment GUI 514. The user input is directed to the component. When the user performs an action that the component should report to its caller, control returns from the component. The return code of the component is placed in the return_code element of the TEMPLATE_RUNTIME structure (Appendix C).

Step 915 allows the application 502 to specify that program execution of the RUN 606 module begins at step 916. At step 916, a call to the action interpreter 610 is made to determine if there is an associated command that needs to be performed by the ACM 204. The action interpreter 610 will be explained further with reference to FIG. 10. As a result of processing in step 916, there may be user input to be evaluated. The user input is stored in the Event element of the TEMPLATE_RUNTIME structure (Appendix C).

Step 917 allows the application 502 to specify that program execution of the RUN 606 module begins at step 918. The current command in the tmpl_command element of the TEMPLATE_RUNTIME structure (Appendix C) is passed to the command dispatcher 618 at step 918, then the control loop is entered at step 920. Step 919 allows the application 502 to specify that execution of the RUN 606 module begins at step 920. Step 920 checks if an error occurs as a result of processing that has been executed in step 916 or step 918. If an error has occurred, control goes to step 930.

The user originated event is evaluated at step 922 by a call to the event interpreter 612. The event interpreter 612 is described with reference to FIGS. 11A and 11B. Step 924 checks to see if any errors have occurred. If an error has occurred, control goes to step 930. If no error occurs at step 924, the focus must be checked at step 926 to see if it is going to change as a result of the previous calls to the action interpreter 610 and/or the event interpreter 612. If focus is changing, control goes to step 928, otherwise control goes to step 932 where it loops back to step 902. In step 928, the ACM 204 checks to see if the application 502 has indicated it is to be notified on a focus change and if so, control goes to step 930. At step 930, control is returned to the application 502. If the application is not to be notified on a focus change, control proceeds to step 932 where it loops back to step 902.

Action Interpreter Function

Figure 10:
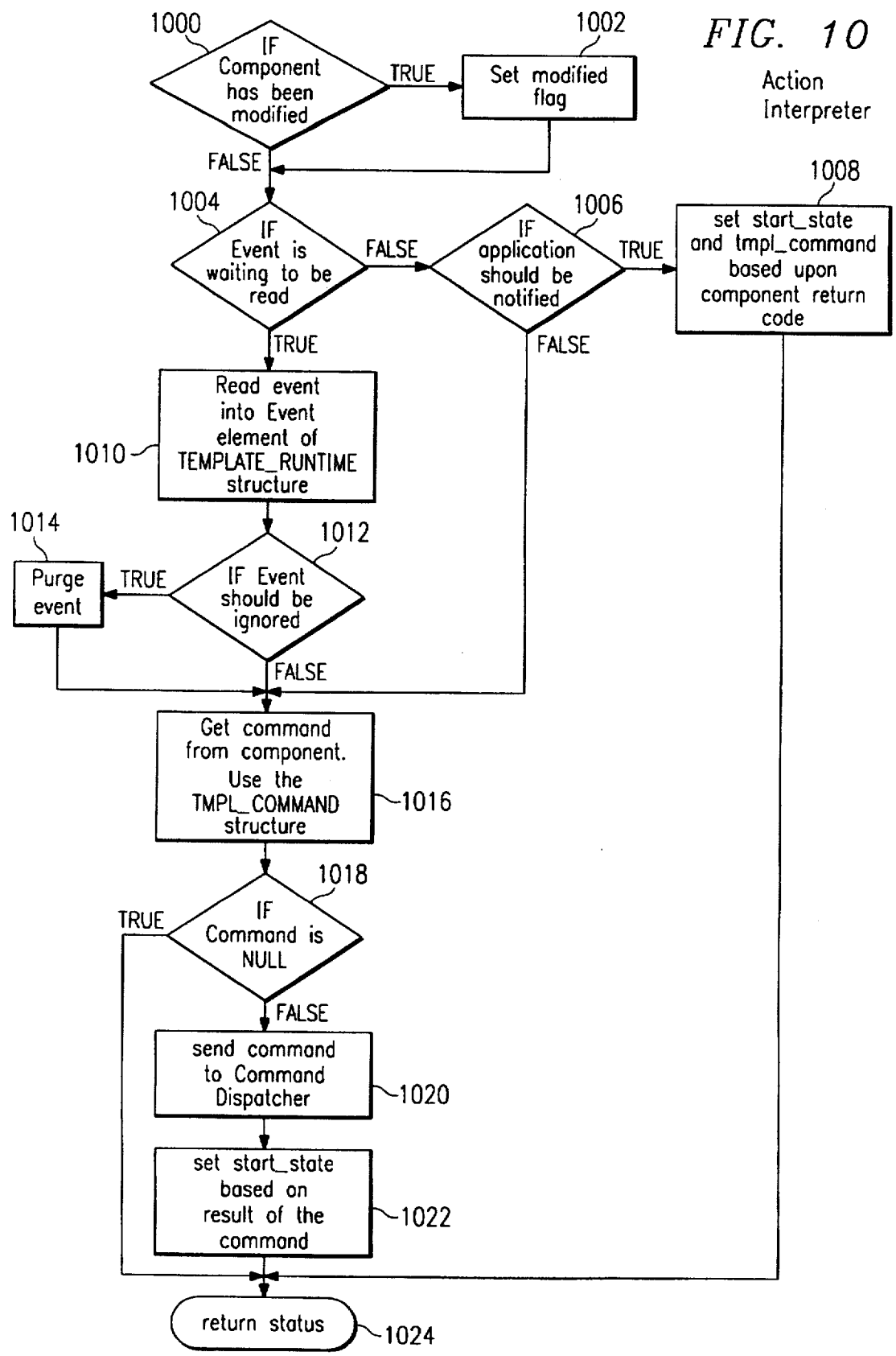
FIG. 10 is a flow chart of the methods of the Action Interpreter function.

FIG. 10 illustrates the control of the action interpreter 610. The action interpreter 610 processes the return code from the component and determines if there is an event to be read, if there is a command to be executed and/or if control should return to the application 502.

Execution of the action interpreter function begins at step 1000, where the return code of the component is checked to determine if the component has been modified. If the component has been modified, control proceeds at step 1002 to set the modified flags in the TEMPLATE_INFO structure (Appendix C). If the current component is an editfield the modified flag in the TMPL_EDIT structure (Appendix C) is also set. Step 1004 determines if there is an event waiting to be read from the operating environment GUI 514. If there is no event waiting to be read, step 1006 determines if the component return code indicates that the application 502 should be notified. If the application 502 is to be notified, step 1008 sets the tmpl_command and start_state elements of the TEMPLATE_RUNTIME structure appropriately based on the return code. This allows control of the RUN 606 module to begin at step 911, 915, 917, or 919 (FIG. 9) as needed when the application 502 subsequently calls the RUN 606 module. Control then goes from step 1008 to step 1024 to return the current status. If notification is not required from step 1006, control goes to step 1016 discussed below.

If a determination is made at step 1004 that an event is to be read, control proceeds to step 1010. The event is placed in the Event element of the TEMPLATE_RUNTIME structure (Appendix C). At step 1012, the component type and event type are checked to determine if the event is to be ignored. An example of events ignored by the ACM 204 are unused arrows from a scrollbar component. If the event is to be ignored, step 1014 purges the event, and control continues with step 1016.

Step 1016 checks the current component structure to determine if there is a command associated with the component return code. Each component definition starts with a TMPL_HEADER structure as described in Appendix C. Within this structure is a pointer to an array of TEMPLATE_CMDS structures. Each structure can specify an ACM command to be executed when the associated return code is encountered for that component. An example of the use of a TEMPLATE_CMDS structure is when a listbox indicates that when selection changes in the listbox, a new record should be read. That is accomplished in the TEMPLATE_CMDS structure by setting the tmpl_command element to CMD_LIST_NEW_RECORD and setting the ret_code element to CMP_SELECT_CHANGE. If a TEMPLATE_CMDS structure is found that matches the component return code and the tmpl_command is not NULL in step 1018, step 1020 will send the command to the command dispatcher 618 to be executed. If no match is found or the command is NULL, the current status is returned in step 1024.

Step 1022 will set the start_state element of the TEMPLATE_RUNTIME structure (Appendix C) based on the return status from the command dispatcher. The current status is returned in step 1024.

Event Interpreter Function

Figure 11A:
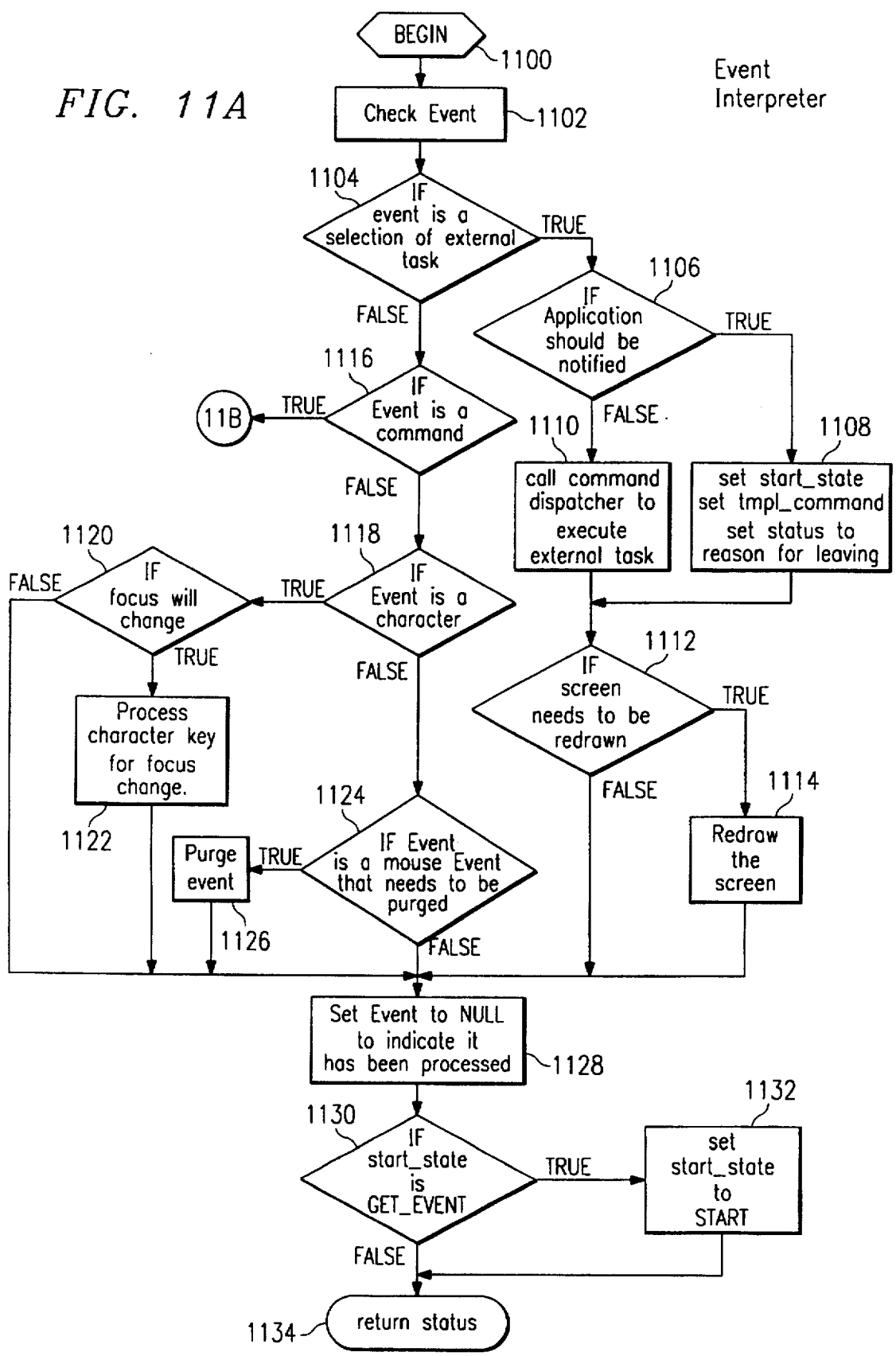
FIGS. 11A and 11B are flow charts of the methods of the Event Interpreter function.
Figure 11B:
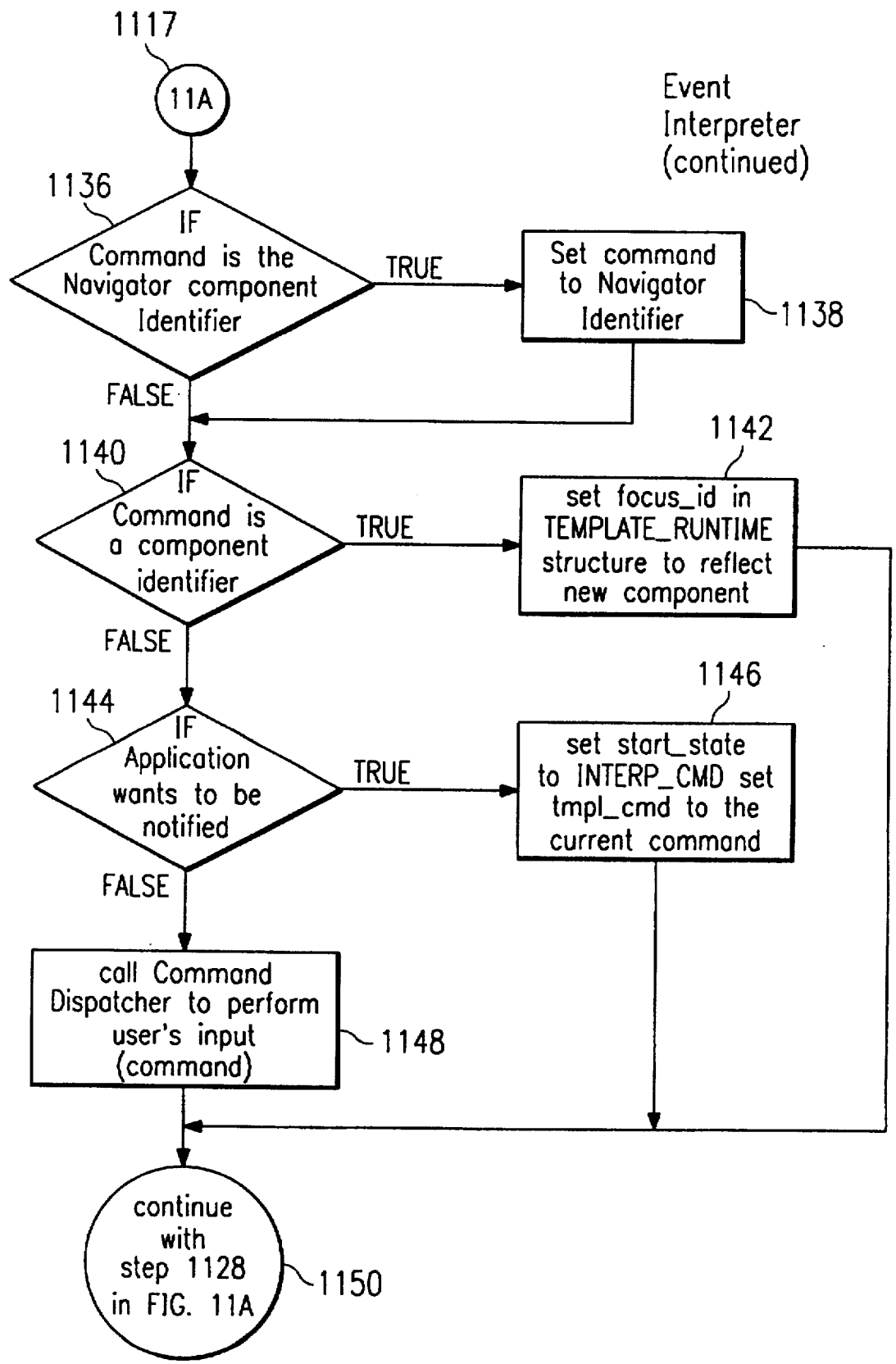

FIGS. 11A and 11B are flow charts illustrating the method of the procedural code implemented in the event interpreter 612. The method is previously referred to at step 922 in the discussion of FIG. 9. The event interpreter 612 function interprets the user oriented events or inputs and the current component state, to generate commands to be sent to the command dispatcher 618. An event is a stored user action. Commands associated with user events include exiting an application, halting execution, running a different task (ie., an accessory or task switch), and changing focus from component to component via the Tab, arrow keys of the keyboard 110, or the pointing device 112. Commands associated with user events also include a variety of pull down menubar commands such as Edit Cut, Edit Copy, Edit Paste, or the like. An ACM command is a collection of function calls to one or more handlers. ACM commands (see further discussion of the command dispatcher 618 below) may be directly associated with menubar items, thus eliminating the need for the application 502 to interpret user input of those menubar items. ACM commands may be used to identify GUI components such that when user input selects that component, the application doesn't have to translate that component identifier into an ACM command.

The method of the procedural code implemented in the event interpreter 612 begins at step 1100 when control passes to step 922 (FIG. 9). At step 1102, the Event element of the TEMPLATE_RUNTIME structure is checked to determine the type of action being requested by the user. The TEMPLATE_RUNTIME structure is described in Appendix C. At step 1104 a determination is made whether the event has been the selection of an external task. An external task is one that is performed wholly outside of the application 502. Examples of external tasks include an accessory program of the operating environment, a help module of the operating environment, or a task switch. If the event is an external task, then at step 1106, the current component must be checked to determine if control should return to the application 502 before performing the requested user action. At step 1108 if control is returning to the application, the start_state in the TEMPLATE_RUNTIME structure is set to indicate that the run module should be entered at step 917 (FIG. 9). The tmpl_command element of the TEMPLATE_RUNTIME structure is set to DO_APPL_COMMAND, the error code is set to the reason for return to the application 502, and control continues at step 1112. If the application 502 doesn't get notified at step 1106, step 1110 calls the command dispatcher 618 to execute the requested user action. The screen redraw flag will be set. At step 1112 the redraw flag for the screen is checked. If the screen redraw flag is set, at step 1114 the screen is redrawn. Control then continues at step 1128.

If the event is not an external task event at step 1104, control proceeds to step 1116. Step 1116 determines if the event is a command. If it is a command, the type of command is determined at step 1117 by the flow indicated in FIG. 11B, discussed below, then control goes to step 1128. In step 1118, if the event is a character, it is processed in step 1120 to determine if the event will cause a change of focus. Character events that can cause a change of focus are: TAB, SHIFT TAB, and arrow movement keys. If a change of focus occurs at step 1120, step 1122 sets the focus_id element of the TEMPLATE_RUNTIME structure to indicate the new focus. Control resumes from step 1122 and step 1120 at step 1128. At step 1124, if the event is a mouse event, the mouse event is purged in step 1126 and control goes to step 1128.

At step 1128, the Event structure in the TEMPLATE_RUNTIME structure is set to NULL, to indicate that the event has been processed. At step 1130, the start_state in the TEMPLATE_RUNTIME structure (Appendix C) is checked to see if it is still set to indicate there is an event waiting to be processed. If this is so, the start_state is set to START in step 1132, to indicate that all necessary processing has been accomplished and processing should continue looping in the main RUN loop. At step 1134, the error code that has previously been set is returned to the application 502 which is step 922 (FIG. 9).

FIG. 11B is a continuation of the flowchart of FIG. 11A illustrating the detail of interpreting the user input if that input is a command. At step 1136 control determines if the command is the Navigator command, a special menubar command. The navigator component is a special component at the bottom of the screen that aids the user in moving between applications. If the command is the Navigator command, control proceeds at step 1138 to set the command to the identifier of the navigator component. If at step 1136, the command is not the navigator command, control proceeds to step 1140. At step 1140, if the command is an ID of one of the components (indicated by being in a specific range of values), step 1142 sets focus_id in the TEMPLATE_RUNTIME structure to the new component. After setting the focus to the new component, control goes to step 1150 for return to step 1128 (FIG. 11A). At step 1144, the current component is checked to determine if control should return to the application 502 before performing the requested user action. At step 1146 if control is returning to the application 502, the start_state in the TEMPLATE_RUNTIME structure is set to indicate that the RUN 608 module should be entered at step 917 (FIG. 9). If control is not returning to the application 502, then step 1148 sends the requested user input to the command dispatcher 618 to be executed. At step 1150 control returns to step 1128 in FIG. 11A.

Command Dispatcher

The command dispatcher 618 is a jump table of all commands supported by the ACM 204. Each command is a collection of function calls to one or more handlers (data handler 624, screen handler 620 and component handler 622) and to data conversion functions. The data conversion functions include a set of data transfer functions and a component reactions function described subsequently in detail. The command dispatcher 618 is accessed as needed by the ACM 204. It can also be accessed directly by the application 502 via the COMMAND 606 function shown in FIG. 6. Below is a partial listing of a jump table which may be used for the command dispatcher 618.

```
;; COMMAND table
;;
cmd_addr:
    dw _cmd_run              ; CMD_RUN
    dw _cmd_exit             ; CMD_EXIT
    dw _display_about        ; CMD_ABOUT
    dw _cmd_edit             ; CMD_CUT
    dw _cmd_add              ; CMD_ADD
    dw _cmd_delete_record    ; CMD_DELETE
    dw _cmd_init_screen      ; CMD_INIT SCREEN
    dw _init_db              ; CMD_INIT_DB
    dw _cmd_get_rec          ; CMD_FIRST_REC
    dw _add_user_cmps        ; CMD_ADD_USER_CMPS
    dw _cmd_get_rec          ; CMD_FETCH_REC
    dw _init_default         ; CMD_INIT_DEFAULT
    dw _open_cmps            ; CMD_OPEN_CMPS
    dw _cmd_close_cmps       ; CMD_CLOSE_CMPS
    dw _check_focus_group    ; CMD_FOCUS_CHANGE
    dw _update_modified      ; CMD_UPDATE_RECORD
    dw _cmd_list_new_record  ; CMD_LIST_NEW_RECORD
    dw _add_modified         ; CMD_ADD_RECORD
    dw _cmd_set_buffer       ; CMD_SET_BUFFER
    dw _cmd_list_set_selected; CMD_LIST_SET_SELECTED
    dw _cmd_first_page       ; CMD_FIRST_PAGE
    dw _cmd_undo             ; CMD_UNDO
    dw _cmd_do_react         ; CMD_PRE_UPD_REACTION
    dw _cmd_do_react         ; CMD_POST_UPD_REACTION
    dw _cmd_run_selector     ; CMD_RUN_SELECTOR
;; end of jump table
```

For example, the command for reading a new record when selection in a listbox changes, then displaying it on the screen (CMD_LIST_NEW_RECORD) will jump to a block of code with the following set of functions:

READ DATABASE RECORD (new selection)—This function calls the data handler 624 and requests a new record be retrieved from the database, based on the criteria set in a TEMPLATE_RECORD structure. The TEMPLATE_RECORD data structure is nested within a TEMPLATE_INFO structure within the TEMPLATE_DATA structure (Appendix C).

DATA TRANSFER (number of fields, pDBASE buffers, pCMP buffers)—This is a set of functions one of which is to copy field information from the database data structures 526 (db_get, db_query Appendix A) into the individual GUI structures (EDITFIELD, LISTBOX Appendix B) for each component.

COMPONENT REACTIONS (new record)—This function sets information in each GUI component structure affected by the new data read in. For example this will push the correct radiobutton, convert julian dates to displayable dates, and set any redraw flags necessary. The component reactions function is described below with reference to FIG. 12.

REDRAW COMPONENTS()—This function calls the screen handler 618 to draw all components on the screen that have their redraw flag set.

The above READ DATABASE RECORD function involves making a call to the operating environment DBMS API 510. This function would be provided by a database management system. The above REDRAW COMPONENTS function is a call into the GUI API 508 of the operating environment. This function would be provided by any GUI system. These functions therefore will not be described further.

The DATA TRANSFER and COMPONENT REACTIONS functions are unique to the invention and allow the system 500 to generalize procedural code across many applications for reacting to user input or events as a specific application defines.

Data Transfer Functions

The data transfer functions of the command dispatcher 618 handle the updating of component data structures based on data read from the data handler 624 into database buffers. The database buffers are not shown but are described in the database data structures 326 of Appendix A. The data transfer functions also handle the converse of updating database data structures 524 based on the contents of the component data structures 526. The data transfer routines use the pBuf pointers (data buffer pointers) in the TEMPLATE_RECORD structure, nested within the TEMPLATE_DATA structure, and the db_get structure of the TEMPLATE_INFO structure, nested within the TEMPLATE_DATA structure to determine what data is copied is which location. In the TEMPLATE_RECORD structure an array of buffer pointers is provided that must correspond one to one with the array of components in the TEMPLATE_SCREEN structure. The database returns a record into a single buffer in the db_get structure. Each field in this buffer is delineated by a NULL character. The data in the db_get buffer is parsed and copied into the array of buffer pointers from the TEMPLATE_RECORD structure. The record number from the db_get structure is placed in the TEMPLATE_RECORD.rec_num element.

Component Reactions Function

Figure 12:
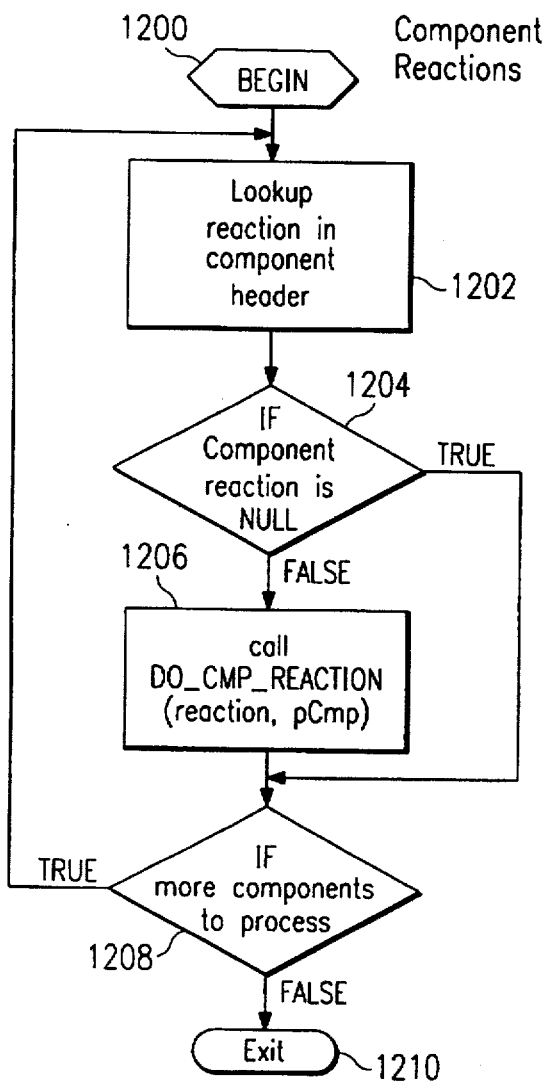
FIG. 12 is a flow chart of the methods of component reactions of the command dispatcher.

FIG. 12 illustrates the operation of the component reactions function of the command dispatcher 618. The component reactions function is used to set the states of components and data, based upon the explicit commands being dispatched in the command dispatcher 618. The TMPL_HEADER structure (Appendix C) which defines a component to the ACM 204 contains four fields for reaction codes. Each field can specify a reaction code for the component that can be sent to the component handler 622. The reaction fields are as follows:

AddReaction field : the component reaction for when the function "add a new record" has been selected.

NewReaction field : the component reaction for when a new record is read from the database file.

BeforeUpdate field : the component reaction indicating how data in the component should be converted before adding or updating a record in the database file.

AfterUpdate field : the component reaction indicating how data that was converted for use in the database should be converted back into a display format.

These reactions are performed automatically when certain user events occur that cause database access. However, it is understood that automatic performance of these functions is not limited to events occurring that cause database access.

The component reactions function illustrated in FIG. 12 begins at step 1200 where it is passed an identifier (ID) indicating which reaction field in the TMPL_HEADER should be used to identify the component's reaction. At step 1202, the ID passed to the component reaction module is used to identify the appropriate field in the TEMPLATE_HEADER for the reaction of the first component. If that field is null at step 1204, control goes to step 1208, discussed below. If a reaction exists for that field, control proceeds to step 1206 and sends the defined reaction and the current component pointer to the component handler 622 module to be executed. For example, a date component may contain the JULIAN_TO_STD4 reaction in the NewReaction field of its TEMPLATE_HEADER. This will convert a julian formatted date (the format in which dates are stored in the database) into a format of mm/dd/yyyy and set the redraw flag of the component containing this date. If there are additional components to be processed at step 1208, control loops back to step 1202 to evaluate the next component. If there are no more components, this module exits back to the command dispatcher 618 at step 1210.

Additional examples of how a component might define its reactions are set forth below.

An editfield that is to display a date in the form mm/dd/yyyy, would contain the following reactions in each of the four fields in the TEMPLATE_HEADER:

AddReaction=CURRENT_DATE4—This will place the current system date in the editfield whenever the menubar command to add a new record is selected by the user.

NewReaction=JULIAN_TO_STD4—This will convert the data read from the database into the correct format for user display BeforeUpdate=STD_TO_JULIAN—This will convert the data in the editfield into a julian date, so it will be in the correct format for the database.

AfterUpdate=JULIAN_TO_STD4—This will convert the data from julian format back into the suitable display format.

Another reaction that is commonly used for buttons is:

EVALUATE_BUFFER—The data in an associated buffer is used to set the state of a TMPL_BUTTON component (usually this is the NewReaction of a TMPL_BUTTON). The atoi (convert ascii to integer) function is performed on the contents of the components buffer. Based on the component type and the result of the conversion, the following occurs.

TMPL_RB—radio button selected=result.

TMPL_IB—icon button .bState=SELECTED if result !=0

.bState=DESELECTED if result=0

TMPL_PB—push button .bState=PB_DOWN if result !=0 bState=PB_UP if result=0

TMPL_CB—check box .bState=CB_CHECKED if result!=0

.bState=CB_UNCHECKED if result=0

The foregoing examples are given to further explain the method of component reactions and are not intended to be limiting.

Print Function

The print function 614 provides a general report generation tool that the application 502 may use to format printed output of record oriented reports. The print function 614 initializes the printer 108. The print routines will automatically fill in a form defined by the application 502 with data read from the disk storage 114. Data is read by making calls to the data handler 624. Data is transferred from the database data structures 526 into the ACM print buffers. The ACM print buffers are part of the ACM data structures 528. The data in the print buffers is converted into a printable format by making calls to the data conversion code 512.

End Function

Figure 13:
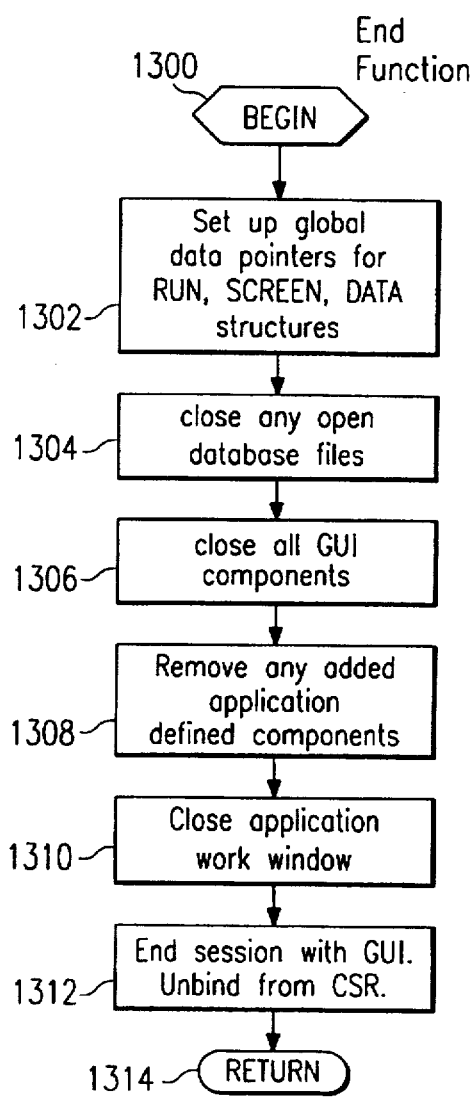
FIG. 13 is a flow chart of the methods of the END function.

FIG. 13 illustrates the flow of control of the END 616 function of the ACM 204.

The END 616 function begins at step 1300. At step 1302 control proceeds by setting up global data pointers to the application TEMPLATE_RUNTIME, TEMPLATE_SCREEN and TEMPLATE_DATA structures (Appendix C). Step 1304 closes the database file as indicated in the TEMPLATE_DATA structure (Appendix C). This is done by calling functions in the data handler 624. The data handler 624 creates the appropriate DBMS structures and calls the database management module 516. Step 1306 closes all the GUI components listed in the TEMPLATE_SCREEN structure. Step 1308 removes any added application defined components that are listed in the TEMPLATE_SCREEN structure from the operating environment. Step 1310 closes the application work window and resets the color palettes of the operating environment. Step 1312 unbinds from the ACM. At that time, the ACM unbinds from the operating environment GUI module 514. Reference is made to the DeskMate Development System manual for a further explanation of unbinding a module prior to program termination. Step 1314 returns to the application 502.

While the invention has been described with specific references to a single preferred embodiment and certain alternatives, there is no intent to limit the invention to that particular embodiment for those specific alternatives. For example, one could implement the application management system in another operating environment for the development and operation of a number of applications. The CUA interface defined by this system may differ according to preferred standards. Input devices are not limited to a keyboard or pointing device and may contemplate any means by which data may be retrieved, such as telecommunication services or other electronic devices. The true scope of the invention is defined not by the foregoing description, but by the following claims.

-32-

APPENDIX A
Copyright 1988, 1989 Tandy Corporation
All Rights Reserved.

This appendix contains a portion of the database management system structures that are used in the DeskMate Database. Further details may be obtained through the DeskMate Development Kit.

Structures used to ADD a record to the database.
```
struct db_valuex       /* used internally in db_add structure    */
{
    char *col_name;           /* pointer to column name      */
    char *col_value;          /* pointer to column value     */
};
typedef struct db_valuex db_value;

struct db_addx         /* used in ADD_ROW, UPDATE_ROW single user calls */
{
    int table_handle;         /* handle of open table */
    int n_columns;            /* number of columns to be added or updated */
    db_value    *val;         /* pointer to an array of db_value structures */
    int prev_rec;             /* previous record, 0= this is first record */
    int next_rec;             /* next record, 0= this is last record */
};
typedef struct db_addx db_add;
```

Structure used to UPDATE a record in the database.
```
struct db_updatex
{
    int table_handle;         /* handle of open table */
    int n_columns;            /* number of columns being selected */
    char **col_names;         /* array col names (in return order) */
    char **pOld_col_values;   /* old column values (in order) */
    char **pNew_col_values;   /* new column values (in order) */
    UNSIGNED    rec_num;      /* current record number */
    char verify_flag;         /* VERIFY or NO_VERIFY */
    int prev_rec;             /* previous record, 0= this is first record */
    int next_rec;             /* next record, 0= this is last record */
};
typedef struct db_updatex db_update;
```

Structure used to DELETE a record in the database.
```
struct db_deletex
{
    int table_handle;         /* handle of table to delete from */
    UNSIGNED    rec_num;      /* record number to delete */
    int num_query_lines;      /* number of constraints */
    char **query_line_array;  /* array of query constraints */
};
typedef struct db_deletex db_delete;
```

Structure used to READ a record from the database.
```
struct db_getx
{
    int table_handle;         /* handle of open table */
    char *buffer;             /* pointer to destination buffer */
    int num_columns;          /* number of columns being selected */
    char **col_array;         /* array of column names (in ret order) */
    int num_query_lines;      /* number of constraints */
    char **query_line_array;  /* array of query constraints */
    UNSIGNED    rec_num;      /* rec num used for prior/after/fetch */
    int index_handle;         /* index_handle to support TEMP_SORT */
};
typedef struct db_getx db_get;
```

-33-

Structure used to read multiple records at a time from
the database.

```
struct db_queryx
{
    int table_handle;        /* handle of open table */
    char *pBuffer;           /* pointer to destination buffer */
    int num_columns;         /* number of columns being selected */
    char **col_array;        /* array col names (in return order) */
    int num_query_lines;     /* number of constraints */
    char **query_line_array; /* array of query constraints */
    int amt_memory;          /* amount of memory app has for recs */
    int rec_cnt;             /* number of records in buffer */
    UNSIGNED   cur_rec_num;  /* next record number to be returned */
    int direction;           /* direction records are assembled in */
    int index_handle;        /* index to retrieve records from */
    unsigned char q_id;      /* current query id */
};
typedef struct db_queryx db_query;

/* defines for query operators,  These are used in each
line in the query_line_array to limit the records that
are retrieved.   */
#define DB_EQUAL     '='    /* all rows equal to the specified value */
#define DB_GREATER   '>'    /* all rows greater or equal to  value */
#define DB_LESS      '<'    /* all rows less or equal to value */
#define DB_NOT_EQUAL '!'    /* all rows not equal to value */
#define DB_SUBSTRING '|'    /* all rows with this substring in the field */
#define REC_CONTAINS '~'    /* all rows with this substring in some field */
```

-34-
APPENDIX B
Copyright 1988, 1989 Tandy Corporation
All Rights Reserved.

This appendix contains a portion of the DeskMate Graphic
User Interface component structures that are referenced
in the Application Management System disclosure. Further
details may be obtained through the DeskMate Development
Kit.

General Component Header - all components definitions
start with this structure.

```
struct cmp_header_defn
{
    int     type;          /* component type */
    char    bEnabled;      /* enable flag for component */
    MAPRECT maprect;       /* origin/extent */
    int     accel;         /* key accelerator for component */
    int     return_code;   /* return code for component */
};
typedef struct cmp_header_defn CMP_HEADER;
```

The following defines the different types of components
that are definable in the DeskMate Operating Environment

```
#define CMP_PUSHBUTTON    CMP_TAG+0
#define CMP_RADIOBUTTONS  CMP_TAG+1
#define CMP_ICONBUTTON    CMP_TAG+2
#define CMP_LISTBOX       CMP_TAG+3
#define CMP_CHECKBOX      CMP_TAG+4
#define CMP_EDIT          CMP_TAG+5
#define CMP_MENUBAR       CMP_TAG+6
#define CMP_MESSAGE       CMP_TAG+7
```

The following defines the possible return codes from
DeskMate components

```
#define CMP_NO_ACTION         0    /* no action taken within component */
#define CMP_ACTION            1    /* component status has changed */
#define CMP_SCROLLED          2    /* scroll occurred */
#define CMP_TRUNCATED         3    /* edit string was truncated */
#define CMP_CANCEL            5    /* component was canceled */
#define CMP_DISABLED          6    /* component was grayed */
#define CMP_GO                7    /* user invoked select and go */
#define CMP_SELECT_CHANGE     8    /* user invoked selection change */
#define CMP_ACTION_IN_EVENT   9    /* cmp action is in the event queue */
#define CMP_APPL             10    /* cmp received an EVENT_APPL event */
```

The MAPRECT structure is referenced in the CMP_HEADER
structure.

```
struct maprect_defn
{
    int    xorg;   /* rectangle x origin */
    int    yorg;   /* rectangle y origin */
    int    xext;   /* rectangle x extent */
    int    yext;   /* rectangle y extent */
};

typedef struct maprect_defn MAPRECT;
```

-35-

A Listbox component is defined using the following structure.

```
struct listbox_defn
{
    CMP_HEADER      header;
    char            bTitle;         /* title selectable flag */
    char            bScroll;        /* scroll direction flag */
    char            bAlphabetize;   /* list alphabetization flag */
    char            bMulti;         /* multi select flag */
    char            border;         /* border type */
    char            bgnd_color;     /* background color */
    char            fgnd_color;     /* foreground color */
    unsigned char   top_string;     /* number of top item in window */
    unsigned char   selected;       /* list box selected item */
    char            *pString;       /* list box title */
    unsigned char   nItems;         /* number of strings */
    char            *pSelected;     /* pointer to selected list */
    char            **pItems;       /* pointer to string list */
};
typedef struct listbox_defn LISTBOX;
```

An editfield component is defined using the following structure.

```
struct editfield_defn
{
    CMP_HEADER  header;
    char        type;           /* edit field type */
    char        bHighlight;     /* flag to highlight field on run */
    char        dec_places;     /* number of places to the right of . */
    MAPRECT     edit_maprect;   /* visible part */
    char        attr;           /* char attribute to use */
    int         cursor_offset;  /* cursor offset into string */
    int         end_offset;     /* offset to end of string */
    int         select_offset;  /* offset to select start */
    int         select_length;  /* length of selected area */
    char        terminator;     /* terminating character of string */
    char        *pBuffer;       /* pointer to edit string */
    char        *pFormat;       /* pointer to format string */
    char        scroll_type;    /* direction of scroll */
    int         scroll_length;  /* number of chars to scroll */
    int         scroll_height;  /* number of rows to scroll */
    char        bNoEdit;        /* editable field flag */
    char        border;         /* border type for editfield */
};
typedef struct editfield_defn EDITFIELD;
```

-36-

APPENDIX C
Copyright Tandy Corporation
All Rights Reserved.

This appendix contains the data structures that are used by the application management system. These structures are included in an application 502 to define to the ACM 204 how the application should appear and behave.

Definitions of constants
Definition of start_state element in the TEMPLATE_RUN structure. This is used in the RUN 608 module.

```
#define  START           0
#define  RUN_CMP         1
#define  INTERP_ACTION   2
#define  GET_EVENT       3
#define  INTERP_CMD      4
```

Definition of component types used in the type element of the TMPL_HEADER structure.

```
#define  TMPL_CB 0     /* checkbox definition */
#define  TMPL_EF 1     /* editfield definition */
#define  TMPL_LB 2     /* listbox definition */
#define  TMPL_SS 3     /* static string definition */
#define  TMPL_CA 4     /* calculating field */
#define  TMPL_GR 5     /* Graphics definition */
#define  TMPL_BR 6     /* Browse index definition */
#define  TMPL_PB 7     /* pushbutton definition */
#define  TMPL_RB 8     /* radio button definition */
define  TMPL_IC 9     /* icon button definition */ define  TMPL_SB 10    /* static box definition */
define  TMPL_SI 11    /* static icon definition */ define  TMPL_IB 12    /* Info box definition */
define  TMPL_IS 13    /* info string definition */
define  TMPL_II 14    /* info icon definition */ define  TMPL_MR 15    /* Multi-record ledger definition */
define  TMPL_UD1 16   /* Application defined component 1 */
#define  TMPL_UD2 17   /* Application defined component 2 */
#define  TMPL_BAR 18   /* Scrollbar component */
#define  TMPL_TB 19    /* Toolbar (Navigator) component */
#define  TMPL_DT 20    /* DATE field, uses cmp reactions with no year */
```

Additional component return codes created and used exclusively in the ACM by application defined components.

```
#define CMP_LEDGER_CMD         21 /* ret code for multi-rcd ledger with waiting
                                     command
#define CMP_LEDGER_SCROLLED    22 /* ret code for multi-rcd ledger which changed
                                     records
#define CMP_MODIFIED           23 /* ret code for CMP_ACTION without event */
#define EC_LEDGER_SCROLLBAR    1  /* ret code from scrollbar embedded inside a ledger
                                     */
#define CMP_SELECTOR_CANCELED  24 /* toolbar selector was canceled */
#define CMP_DB_ERROR           25 /* ledger detected a database error */
```

-37-

Definitions of possible component reactions. These values are placed in the TMPL_HEADER fields for the elements AddReaction, NewReaction, BeforeUpdate, and AfterUpdate.

```
#define  DO_NOTHING              0
#define  CLEAR_BUFFER            0x01
#define  EVALUATE_BUFFER         0x02
#define  SET_REDRAW              0x03
#define  SET_BUFFER              0x04
#define  SET_TITLE_SELECT        0x05
#define  SET_SELECTED_STATE      0x06
#define  SET_DESELECTED_STATE    0x07
#define  STD_TO_JULIAN           0x08
#define  JULIAN_TO_STD2          0x09
#define  JULIAN_TO_STD4          0x0A
#define  CURRENT_DATE4           0X0B
#define  CURRENT_DATE2           0x0C
#define  UPDATE_LIST             0x0D
#define  LEDGER_ADD              0x0E
#define  STD0_TO_JULIAN          0x0F
#define  JULIAN_TO_STD0          0x10
#define  CURRENT_DATE0           0x11
#define  INIT_SCROLLBAR          0x12    /* only for use with editfld sb's */
#define  SET_SELECTED_RB         0x30    /* selected is actual value minus 0x30 */
#define  MAX_SELECTED_RB         0x5F    /* 0x30 - 0x5F (48) buttons */
#define  CMP_ALWAYS_REACT        0x80    /* high bit is group mask - always do */
                                         /* reaction if set */
```

Structure definitions

The TMPL_HEADER structure is the starting structure for all GUI and application defined components that are to be displayed and run by the ACM.

```
struct tmpl_header_defn
{
    char    type;              /* id type for ACM component */
    char    *pCSRStruct;       /* ptr to CSR structure to pass to GUI functions*/
    char    group;             /* component group, update on group change */
    char    bFocus;            /* return on focus if set */
    unsigned char AddReaction; /* component reaction when a record is to be
                                  added */
    unsigned char NewReaction; /* component reaction when a new record has
                                  been read */
    unsigned char BeforeUpdate;/* component reaction before updating a
                                  record */
    unsigned char AfterUpdate; /* component reaction after update updating a record*/
    int     nCmds;             /* Number of supported commands for component */
    TEMPLATE_CMDS **pCmds;     /* array of CMP_* return code/commands */
}
typedef struct tmpl_header_defn TMPL_HEADER;
```

The TEMPLATE_CMDS data structure referenced in the TMPL_HEADER of each component is used to identify commands that are associated with a component return code. It is used by the action interpreter at step 1016 in FIG. 10.

```
struct tmpl_menucmd_defn
{
    unsigned int ret_code;
    unsigned int tmpl_command;
}
typedef struct tmpl_menucmd_defn TEMPLATE_CMDS;
```

-38-

The STATIC_HEADER is part of every static item, including pictures that are to be drawn by the ACM.
```
struct tmpl_static_header_defn
{
        char    type;           /* id type for template static element */
        char    *pCSRStruct;    /* ptr to CSR structure to pass to the CSR */
}
typedef struct tmpl_static_header_defn STATIC_HEADER;
```

The TEMPLATE_INFO structure is used to tie together all the database structures for a set of components .
```
struct tmpl_list_info_defn
{
    char type;                      /* INFO_LIST or INFO_MULTI */
    unsigned char max_items;        /* Maximum number of items for list box, */
                                    /* number of records on screen for multi-rec */
    unsigned char n_items;          /* Actual number of items in list box, */
                                    /* number of records to init for multi-rec */
    db_query  *pQry;                /* Query structure to retrieve list items */
                                    /* the query currently in effect resides here */
    db_get          *pGet;          /* database single record get structure */
    db_update       *pUpdate;       /* database update structure */
    db_add          *pAdd;          /* database add structure */
    char            **ptrs;         /* Array of pointers to items or records */
    BUF_STATUS *pBufStat;           /* Pointer to Buffer Status structure */
    TEMPLATE_RECORD *pCurRec;       /* Current record structure */
    char            req_focus;      /* focus id of field that is required */
}
typedef struct tmpl_list_info_defn TEMPLATE_INFO;
```
Note in the above structure, the database structures db_query, db_get, db_update, db_add are defined in Appendix A and further detailed in the DeskMate Development Kit.

The following structure is used by the ACM to bring together the record number, modified flag, and buffer pointers to each field in a database record. The TEMPLATE_RECORD structure is used by the data transfer routines in the ACM.
```
struct tmpl_record_defn
{
        unsigned int rec_num;
        char            bModified;
        char            **pBufs;
}
typedef struct tmpl_record_defn TEMPLATE_RECORD;
```

-39-

The BUF_STATUS structure is part of the TEMPLATE_INFO structure. It is used when reading multiple records from the database file. It keeps track of the number of records in memory, their relative position in the file, and the number of records remaining to be read from the database file.

```
struct buf_status_defn
{
    char    FirstRecIn;     /* First record present in buffer */
    char    LastRecIn;      /* Last record present in buffer */
    int     FirstIno;       /* List's first index number */
    int     LastIno;        /* List's last index number */
    char    DispSize;       /* List display size */
    int     AbsFirstRec;    /* Abs First rec # in buffer */
    int     AbsLastRec;     /* Abs Last rec # in buffer */
    int     NumMatch;       /* Number of records matching the query */
}
typedef struct buf_status_defn BUF_STATUS;
```

The TEMPLATE_DATA structure contains pointers to all the necessary data structures that are used by the data handler 624 to interface with the database management system.

```
struct tmpl_data_defn
{
    char            *pFile;         /* database file name */
    char            pTable;         /* database table name */
    char            nInfo;          /* number of * INFO structs */
    TEMPLATE_INFO   **pInfo;        /* array of INFO_LIST or INFO_MULTI structs */
    int             FileHandle;     /* handle of opened file */
    int             TableHandle;    /* handle of opened table */
    char            *Pathname;      /* fully expanded filename (65 char buffer) */
    int             db_errno;       /* Database error causing return */
    char            floppy;         /* 0 if file not on a floppy drive, else drive */
}
typedef struct tmpl_data_defn TEMPLATE_DATA;
```

The TEMPLATE_SCREEN structure defines the components, including the menubar, static elements, graphic pictures, the title line, filename, background and foreground colors, and the background pattern that are used by the screen handler 620 when displaying the screen.

```
struct tmpl_screen_defn
{
    char            *title;         /* template title (8 chars max.) */
    char            *pFile;         /* Data file name (for ttl_put_data_name) */
    MENUBAR         *pMainMenubar;  /* pointer to main menubar structure */
    char            nCmps;          /* number of components */
    TMPL_HEADER     **pCmps;        /* pointers to array of ptrs to components */
    int             *pHandles;      /* Open component handles */
    char            *pRedraw;       /* pointer to array of redraw flags */
    int             nStatics;       /* number of static items */
    STATIC_HEADER   **pStatics;     /* ptr to array of ptrs to static items */
    char            bg_color;       /* base window background color */
    char            fg_color;       /* base window foreground color */
    char            bg_pattern;     /* base window background pattern */
                                    /* NOTE: colors will be set, then the pattern */
    int             hBaseWindow;    /* Base window handle */
    int             hWorkWindow;    /* Work window handle */
}
typedef struct tmpl_screen_defn TEMPLATE_SCREEN;
```

-40-

The TEMPLATE_RUNTIME structure is the primary data
structure used by the ACM. It contains pointers to the
TEMPLATE_SCREEN and TEMPLATE_DATA structures. It also
contains information about the current state of the
application in the start_state, return_code,
tmpl_command, and Event elements.

```
struct tmpl_runtime_defn
{
    char          focus_id;      /* component with focus */
    char          focus_add;     /* component to get focus on ADD_RECORD */
    char          prev_focus;    /* component that previously had focus */
    char          cur_group;     /* current component group */
    TEMPLATE_DATA   *pData;      /* Data handler structure */
    TEMPLATE_SCREEN *pScreen;    /* Screen handler structure */
    char          start_state;   /* point to start in main loop */
    unsigned int  return_code;   /* return code of cmp with current focus */
    unsigned int  tmpl_command;  /* command that forced return to app */
    EVENT         Event;         /* Event structure for storage of user input during RUN*/
    APPL_VERSION  *pAbout;       /* pointer to About structure */
    PDMINTL       *pIntl;        /* pointer to international structure */
}
typedef struct tmpl_runtime_defn TEMPLATE_RUNTIME;
```

The following structures illustrate how GUI components
are defined for use by the ACM. Each ACM component
structure contains a pointer to the GUI component
structure in the TMPL_HEADER.

EDITFIELD STRUCTURE
```
struct tmpl_editfield_defn
{
    TMPL_HEADER tmpl_header;   /* header */
    char bg_color;             /* non-focus background color */
    char fg_color;             /* non-focus foreground color */
    char bModified;
};
typedef struct tmpl_editfield_defn TMPL_EDIT;
```

LISTBOX STRUCTURE
```
struct tmpl_listbox_defn
{
    TMPL_HEADER tmpl_header;      /* Header */
    TEMPLATE_INFO *pListInfo;     /* type should be INFO_LIST */
    char          bg_color;       /* non-focus background color */
    char          fg_color;       /* non-focus foreground color */
};
typedef struct tmpl_listbox_defn TMPL_LISTBOX;
```

CHECKBOX, ICONBUTTON, PUSHBUTTON, or RADIO BUTTON GROUP
STRUCTURE
```
struct tmpl_button_defn
{
    TMPL_HEADER tmpl_header;       /* template header */
    char        *buffer;           /* buffer to check for number */
    char        bg_color;          /* background color */
    char        fg_color;          /* foreground color */
};
typedef struct tmpl_button_defn TMPL_BUTTON;
```

-41-

DATE fields that display only 2 digits for the year, use a TMPL_DATE structure which provides a buffer area for storing the full 4 digit year.

```
struct tmpl_date_defn
{
    TMPL_HEADER tmpl_header;      /* template header */
    char        bg_color;         /* background color */
    char        fg_color;         /* foreground color */
    char        *year;            /* pointer to a 5 char buffer to hold year+NULL */
};
typedef struct tmpl_date_defn TMPL_DATE;
```

Application defined components structures

Multi-record LEDGER definition. The code for the application defined LEDGER component resides in the ACM. This is an application defined component as far as the DeskMate operating environment is concerned.

```
struct ledger_defn
{
    CMP_HEADER  header;        /* all user-defined components have this */
    char        nAcross;       /* number of columns across */
    char        nDown;         /* number of rows */
    int         y_incr;        /* world coordinate height of a row */
    char        sel_row;       /* row number of current focus */
    char        sel_col;       /* column number of current focus */
    int         cmp_ret_code;  /* return code from sub-component */
    TMPL_HEADER **pTCmps;      /* pointer to array of component pointers which */
                               /* define the first row of the ledger */
    TEMPLATE_INFO *pInfo;      /* pointer to structure containing db_query info*/
                               /* and pointer to record buffer array */
    int  (far *Display)();     /* far pointer to routine to call before records */
                               /* are displayed */
    char        *pRedraw;      /* pointer to sub-component redraw flags */
    CMP_HEADER  **ScrollBar;   /* pointer to array of cmps for scroll bar */
    char        bAdd;          /* Allow new records? ENABLED - YES, DISABLED - NO*/
    char        add_focus;     /* column to go to on add record (0 oriented ) */
    MAPRECT     *pHilite;      /* pointer to coordinates for hilighting cursor */
                               /* set to null if hilite not desired         */
};
typedef struct ledger_defn LEDGER;
```

BROWSE Application defined component

```
struct tmpl_browse_defn
{
    TMPL_HEADER tmpl_header;        /* template header */
    char        num_tabs;           /* number of tabs to display */
};
typedef struct tmpl_browse_defn TMPL_BROWSE;
```

All application defined components whose code is contained in the application are defined with a TMPL_USER structure.

```
struct user_cmp_defn
{
    TMPL_HEADER tmpl_header;     /* template header */
    CMP_ROUTINES *routines;      /* pointer to routines for cmp_add */
}
typedef struct user_cmp_defn TMPL_USER;
```

Definition of static elements

-42-

```
GRAPHIC PICTURES
struct tmpl_graphic_defn
{
    STATIC_HEADER tmpl_header;   /* header */
    int         x_org;           /* x coordinate of graphic */
    int         y_org;           /* y coordinate of graphic */
};
typedef struct tmpl_graphic_defn TMPL_GRAPHIC;

STATIC_STRING
struct tmpl_ss_defn
{
    STATIC_HEADER tmpl_header;   /* template header */
    char        bg_color;        /* color of the background */
    char        text_color;      /* color of the text */
    int         char_width;      /* default 0 = CHAR_XEXT - if zero none will be set*/
    int         char_height;     /* default 0 = CHAR_YEXT */
};
typedef struct tmpl_ss_defn TMPL_STRING;

STATIC_BOXES
struct tmpl_stat_defn
{
    STATIC_HEADER tmpl_header;   /* template header */
    int         pattern;
    char        bg_color;        /* default to COLOR1 for under buttons */
};
typedef struct tmpl_stat_defn TMPL_STBOX;

ICONS
struct tmpl_stat_icon_defn
{
    STATIC_HEADER tmpl_header;              /* template header */
    unsigned char Rotate;                   /* rotate ICON 0, 90, 180, or 270 degrees */
};
typedef struct tmpl_stat_icon_defn TMPL_ICON;

Structures and defines used in defining a report follow.
/* report data types */
#define ONE_RECORD         0
#define MULTIPLE_RECORDS   1
#define ONE_LEDGER         2
#define MULTIPLE_LEDGERS   3
#define ONE_FORM           4
```

```
/* defines for print field types */
#define TEXT                0       /* plain straight text */
#define FORMATTED_TEXT      1       /* text in a special pattern */
#define SUM                 5       /* money to be summed for a total */
#define CAR_RETURN          6       /* put out the fields already on a line */
#define BLANK_LINE          7       /* put out a blank line */
#define END_REPORT          8       /* end of a report definition string */
#define INIT_EXISTING_FORM  9       /* must be called before ADD_TO_FORM with
                                     a form that already contains something */
#define INIT_NEW_FORM       10      /* must be called before ADD_TO_FORM with
                                     empty form */
#define ADD_TO_FORM         11      /* add this string to an existing picture */
#define DRAW_FORM           12      /* this causes an form to be printed */
#define EXPANDED_DATE       13      /* takes a julian date and converts to
                                     * Day of week Month Day, Year */
#define EXPANDED_INC_DATE   14      /* takes a julian date and converts to
                                     * Day of week Month Day, Year
                                     * then increments it for the
                                     * next date */
#define START_BOLD          15      /* begin bold on a string */
#define END_BOLD            16      /* end bold on a string */
#define START_UNDERLINE     17      /* begin underline on a string */
#define END_UNDERLINE       18      /* end underline on a string */
#define START_ITALIC        19      /* begin italics on a string */
#define END_ITALIC          20      /* end italics on a string */
#define JUL_TO_STD_DATE0    21      /* convert julian to std for printout */
#define JUL_TO_STD_DATE2    22      /* convert julian to std for printout */
define JUL_TO_STD_DATE4    23      /* convert julian to std for printout */ define LINE_COUNT          24      /* the number of lines the report field occupies */
define APPEND_TO_PREV      -1          /* append this string to the previous string */
```

The REPORT_FORMAT structure defines how to put a special case field on a report.

```
struct report_format_defn
{
        /* a string of format chars, use '0x16' where a char from the text string
           should be placed, for decimal type put '0x16' for each decimal place but
           don't include the decimal point itself */
    char *pformat;

/* for MAKE_A_FORM, ADD_TO_FORM this is the form the string in
           report_field->pString will be added to, for DRAW_FORM this is the form
           that is drawn */
    char *pForm;

long calc_value;    /* if summing a field, this will store the sum value */ char append_value;  /* if start column
                           is APPEND_TO_PREV this is how many spaces to skip
                           before appending field */

/* for MAKE_A_FORM, ADD_TO_FORM, these ints will
           define the form element the string will be turned into */
    int font_size;      /* size of the font */
    int font_num;       /* which font to use */
    int color;          /* color of the string */
    int attr;           /* attributes of the string */
    int x;              /* x coord of where to put the string in the form */
    int y;              /* y coord of where to put the string in the form */
    int form_size;      /* size of form in words */
    int stroke_size;    /* size of stroke list in bytes */
};
typedef struct report_format_defn REPORT_FORMAT;
```

-44-

The REPORT_FIELD structure defines how to put a field on report

```
struct report_field_defn
{
    char type;          /* type of field to be output */

/* field or string to be put out, for MAKE_A_FORM, ADD_TO_FORM this string
                           will be put out as text if the printer uses the ascii driver */
    char *pString;

char start_column;  /* x coord of where to put string, or APPEND_TO_PREV */
    char end_column;    /* x coord of where to end a string, if start column
                           is APPEND_TO_PREV this is how many spaces to skip
                           before appending field */
    REPORT_FORMAT *pformat_field; /* for special case fields */
};
typedef struct report_field_defn REPORT_FIELD;
```

The BODY_DEFN structure defines how the body of the report is printed.

```
struct body_defn
{
    char type;                       /* type of report */
    char starting_column;            /* column to begin printing multi column
                                        report */
    char column_offset;              /* offset of second column */
    REPORT_FIELD *pBodyHeader;       /* printed before this body */
    REPORT_FIELD *pGroupHeader;      /* printed before each group within body */
    REPORT_FIELD *pAltGroupHeader;   /* printed if a group splits across a page */
    REPORT_FIELD *pRecordHeader;     /* header printed before each record */
    REPORT_FIELD *pRecord;           /* record to be printed */
    REPORT_FIELD *pRecordFooter;     /* printed after each record */
    REPORT_FIELD *pGroupFooter;      /* printed after each group */
    REPORT_FIELD *pBodyFooter;       /* printed after each body */
    char page_ejection;
};
typedef struct body_defn BODY_DEFN;
```

The REPORT_DEFN defines all the pieces of the report.

```
struct report_defn
{
    char right_margin;         /* the right margin of the page */
    char *pPage_Buff;          /* ptr to the data buffer */
    REPORT_FIELD *pHeader;     /* header that only appears on the first page */
    BODY_DEFN *pBody1;         /* first body */
    BODY_DEFN *pBody2;         /* second body */
    BODY_DEFN *pBody3;         /* third body */
    REPORT_FIELD *pfooter;     /* report footer */
};
typedef struct report_defn REPORT_DEFN;
```

-45-

The PRT_ROUTINES structure provides for 10 different call back addresses into the application at specific points in the report generation.

```
struct print_routines_defn
{
    int (far *pSetupGroupQuery1)( );    /* ptr to routine to setup group query */
    int (far *pFormatRecord1)( );       /* ptr to routine to format record in body */
    int (far *pProvideRecord1)( );      /* ptr to routine to fetch record */
    int (far *pSetupGroupQuery2)( );    /* ptr to routine to setup group query */
    int (far *pFormatRecord2)( );       /* ptr to routine to format record in body */
    int (far *pProvideRecord2)( );      /* ptr to routine to fetch record */
    int (far *pSetupGroupQuery3)( );    /* ptr to routine to setup group query */
    int (far *pFormatRecord3)( );       /* ptr to routine to format record in body */
    int (far *pProvideRecord3)( );      /* ptr to routine to fetch record */
    int (far *pSetupBody)( );           /* ptr to routine to fetch record to reprint body */
};
typedef struct print_routines_defn PRT_ROUTINES;
```

What is claimed is:

1. A method for providing an operating environment for multiple applications using a common user access interface in a computer system, said computer system comprising a display, a system memory, and mass storage, the method comprising the steps of:

including application control module ("ACM") data structures in an application;

specifying graphic user interface data structures;

specifying database data structures for reading data from and writing data to a database, wherein a relationship between said graphic user interface data structures and said database data structures is defined by said ACM data structures;

loading a control module into said system memory, said control module being external to said application, said control module comprising procedural code and data conversion code for use by said application, said ACM data structures including data for use by said control module for defining an appearance of said application on said display and an operation of said application responsive to user input events, said control module comprising data transfer modules configured to automatically transfer data between said database data structures and said user interface data structures said control module further comprising data conversion functions to convert data formats between said database data structures and said user interface data structures;

dynamically linking said control module to said application;

initializing said data structures by means of said control module;

presenting on said display said application as defined by said data structures by means of said control module; and processing by means of said control module user input events in accordance with the operation of said application as defined by said data structures.

2. The method of claim 1, said linking step further comprising the steps of:

loading said control module into said computer memory; and dynamically linking said control module to said application.

3. The method of claim 1, said initialization step further comprising the steps of:

initializing said screen;

adding application defined user interface components to said operating environment;

initializing user interface components, said components including graphic user interface and application defined components;

opening a database file and reading stored data from said file; and converting said stored data into graphic user interface data.

4. The method of claim 1, said processing step comprising:

(a) indicating current user input location and method on said screen;

(b) accepting user input through the graphic user interface of said system;

(c) determining commands based on said user input;

(d) processing said commands;

(e) repeating steps (a) through (d) until an error or a user directed exit occurs.

5. The method of claim 1, further comprising the step of closing by means of said module said application said closing step further comprising:

restoring said screen to its previous state;

deleting application defined user interface components from said operating environment;

closing a database file; and exiting said application.

6. The method of claim 3, said converting step comprising the steps of:

transferring stored data from database data structures of said data to graphic user interface data structures of said data; and setting states of said graphic user interface data structures to graphically represent contents of said stored data.

7. The method of claim 4, wherein said indicating step is done by graphic enhancement of the display of said location.

8. The method of claim 4, said determining step comprising the steps of:

generating a component return code based on said user input; and determining whether there is a command associated with said component return code.

9. The method of claim 4, said determining step comprising the steps of:

generating an event based on said user input; and determining whether there is a command associated with said event.

10. The method of claim 4, said processing step comprising executing said command.

11. The method of claim 4, said processing step comprising notifying said application of said command.

12. The method of claim 9, wherein said generating step comprises defining an event associated with the selection of a graphic user interface component to be a command.

13. The method of claim 10, wherein said executing step comprises executing screen handler functions.

14. The method of claim 10, wherein said executing step comprises executing data handler functions.

15. The method of claim 10, wherein said executing step comprises executing component handler functions.

16. The method of claim 10, wherein said executing step comprises executing data transfer functions by transferring stored data from database data structures of said data to graphic user interface data structures of said data.

17. The method of claim 10, wherein said executing step comprises executing component reactions by setting a state of graphic user interface data structures of said data to graphically represent contents of said stored data.

18. The method of claim 11, wherein said processing step further comprises the step of said application calling a tm_cmd function of said module.

19. The method of claim 11, wherein said processing step further comprises the step of said application calling a tm_print function of said module to format and print said stored data.

20. A system for providing an operating environment for multiple applications using a common user access interface in a computer system, comprising:

a computer having a processor and memory;

a display coupled to said computer;

an input device coupled to said computer;

at least one application, coupled to said memory, said application including a plurality of data structures;

a control module coupled to said memory and dynamically linked to said application, said control module forming a part of said operating environment and including procedural code and data conversion code for said application, said data structures of said application comprising data for defining the appearance and operation of said application;

said control module including initializing means for initializing said data structures;

said control module including draw means for presenting a display screen defined by said data structures;

said application including database data structures for accessing a database;

said application including graphic user interface structures for defining graphic user interface components;

said control module including data conversion means for defining a relationship between said graphic user interface structures and said database data structures;

said control module including first data transfer functions configured to handle the updating of user interface components based on data from said database;

said control module including second data transfer functions configured to handle the updating of said database based on data from said user interface components;

said control module including run means for processing user input events in accordance with the operation defined by said graphic user interface data structures; and said control module including end means for closing said application.

21. The system of claim 20 wherein said initializing means comprises:

means for initializing said screen;

means for adding application defined user interface components to said operating environment;

means for initializing user interface components, said components including graphic user interface and application defined components;

means for opening a database file and reading stored data from said file; and means for converting said stored data into graphic user interface data.

22. The system claim 20 wherein said run means executes commands.

23. The system of claim 20 wherein said run means notifies said application of commands.

24. The system of claim 20 wherein said run means executes screen handler functions.

25. The system of claim 20 wherein said run means executes data handler functions.

26. The system of claim 20 wherein said run means executes component handler functions.

27. The system of claim 20 wherein said run means executes data transfer functions by transferring stored data from database data structures of said data to graphic user interface data structures of said data.

28. The system of claim 20 wherein said run means executes component reactions by setting states of graphic user interface data structures of said data to graphically represent contents of said stored data.

29. The system of claim 21, said converting means comprising:

means for transferring stored data from database data structures of said data to graphic user interface data structures of said data; and means for setting states of said graphic user interface data structures to graphically represent contents of said stored data.

* * * * *